United States Patent
Yamazaki et al.

(10) Patent No.: US 7,050,190 B2
(45) Date of Patent: *May 23, 2006

(54) INFORMATION-PROCESSING APPARATUS AND INFORMATION-PROCESSING METHOD

(75) Inventors: Tomotaka Yamazaki, Kanagawa (JP); Hiromitsu Baba, Kanagawa (JP); Toyoaki Kishimoto, Tokyo (JP); Shinsaku Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 977 days.

This patent is subject to a terminal disclaimer.

(21) Appl. No.: 09/862,656

(22) Filed: May 21, 2001

(65) Prior Publication Data

US 2002/0046216 A1    Apr. 18, 2002

(30) Foreign Application Priority Data

| May 22, 2000 | (JP) | ............................ 2000-154424 |
| May 24, 2000 | (JP) | ............................ 2000-157981 |
| Jun. 5, 2000 | (JP) | ............................ 2000-172008 |

(51) Int. Cl.
*G06F 3/12* (2006.01)
*G06F 15/00* (2006.01)
*G06K 1/00* (2006.01)

(52) U.S. Cl. ........................ 358/1.15; 709/219; 707/201

(58) Field of Classification Search ............... 358/1.15, 358/1.16, 426.5, 444; 709/219, 203; 707/201; 711/114, 115

See application file for complete search history.

(56) References Cited

U.S. PATENT DOCUMENTS

| 3,644,936 A | * | 2/1972 | Holtwick et al. ............. 714/38 |
| 5,805,297 A | * | 9/1998 | Furuya et al. ............. 358/400 |
| 6,259,859 B1 | * | 7/2001 | Katsuki et al. ............. 386/104 |
| 6,493,743 B1 | * | 12/2002 | Suzuki ........................ 709/203 |
| 6,601,139 B1 | * | 7/2003 | Suzuki ........................ 711/115 |

* cited by examiner

*Primary Examiner*—Kimberly Williams
*Assistant Examiner*—Negussie Worku
(74) *Attorney, Agent, or Firm*—Frommer Lawrence & Haug LLP; William S. Frommer; Samuel S. Lee

(57) ABSTRACT

Disclosed is an information-processing apparatus comprising: storage means for storing application programs and data files; calculating means for activating an application program stored in the storage means to carry out predetermined processing; media drive means for recording and playing back information into and from an external recording medium; and control means which controls the media-drive means and the storage means when the external recording medium for recording an application program is mounted on the media drive means so that: when the storage means includes a remaining free storage area with a size large enough for accommodating the application program recorded in the external recording medium, the application program recorded in the external recording medium is installed in the storage means; but when the storage means includes a remaining free storage area with a size not large enough for accommodating the application program recorded in the external recording medium, on the other hand, an application program or a data file stored in the storage means is saved to the external recording medium in order to allocate a free storage area in the storage means and then the application program recorded in the external recording medium is installed in the storage means.

23 Claims, 29 Drawing Sheets

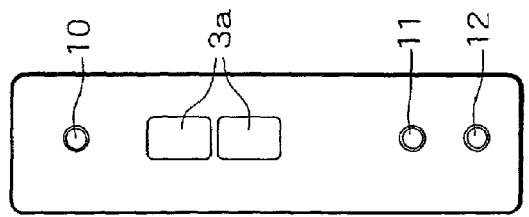
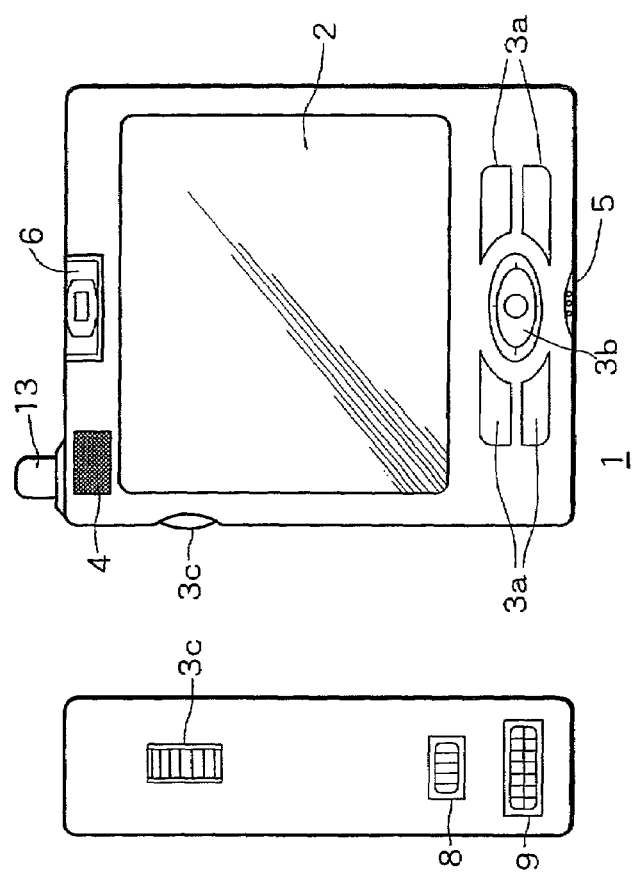
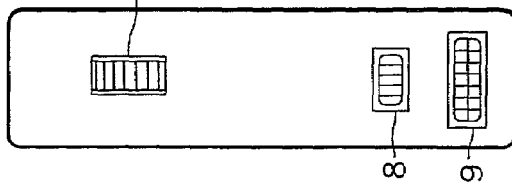

DATABASE STRUCTURE ( • RESOURCE DATABASE
  (CORRESPONDING TO THE EXECUTION FILE)
  • DATABASE DATABASE
  (CORRESPONDING TO A DATA FILE) )

PROCESSING HIERARCHY OF FILE SYSTEM

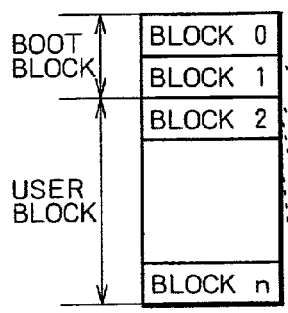
FIG. 8A
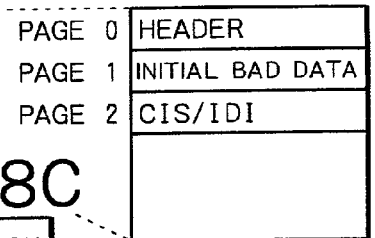
FIG. 8B
FIG. 8C
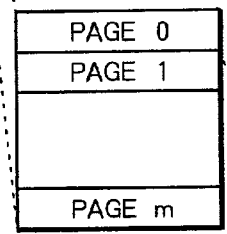
FIG. 8D
FIG. 8E
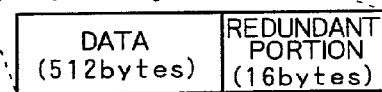
FIG. 8F
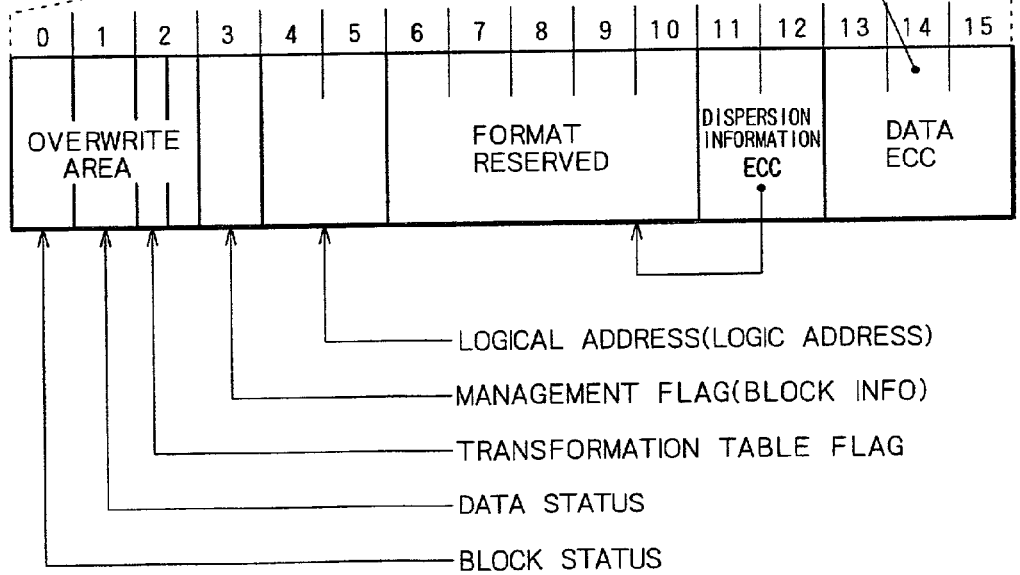

FIG. 9

MANAGEMENT FLAG

| BIT | DEFINITION |
|---|---|
| 7 | RESERVED |
| 6 | RESERVED |
| 5 | ACCESS PERMISSION (1:FREE 0:READ-PROTECTED) |
| 4 | COPY-INHIBIT SPECIFICATION (1:OK 0:NG) |
| 3 | TRANSFORMATION TABLE FLAG (1:INVALID 0:TABLE BLOCK)<br>*ONLY THE LAST SEGMENT IS VALID |
| 2 | SYSTEM FLAG (1:USER BLOCK 0:BOOT BLOCK) |
| 1 | RESERVED |
| 0 | RESERVED |

FIG.11

| PHYSICAL ADDRESS (2 BYTES) | | LOGICAL ADDRESS (2 BYTES) |
|---|---|---|
| 0x00 | 0x03 | → PHYSICAL ADDRESS 0x0000 |
| 0x00 | 0x04 | → PHYSICAL ADDRESS 0x0001 |
| 0x00 | 0x04 | → PHYSICAL ADDRESS 0x0002 |
| 0x00 | 0x05 | → PHYSICAL ADDRESS 0x0003 |
| 0x01 | 0xA8 | → PHYSICAL ADDRESS 0x0004 |
| 0x00 | 0x06 | → PHYSICAL ADDRESS 0x0005 |

IN AN ORDER OF INCREASING LOGICAL ADDRESSES, PHYSICAL ADDRESSES CORRESPONDING TO THE LOGICAL ADDRESSES ARE STORED.

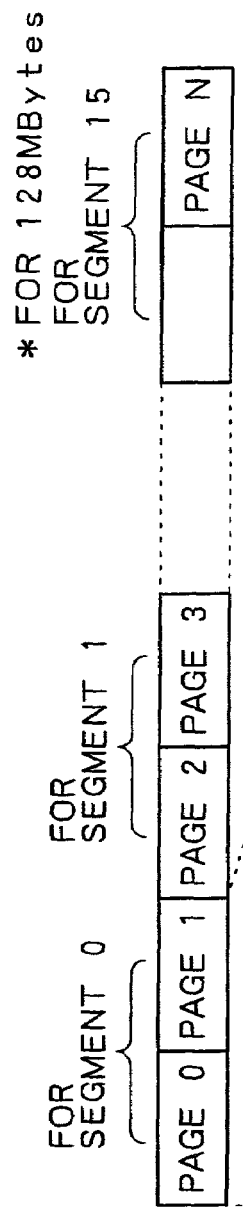
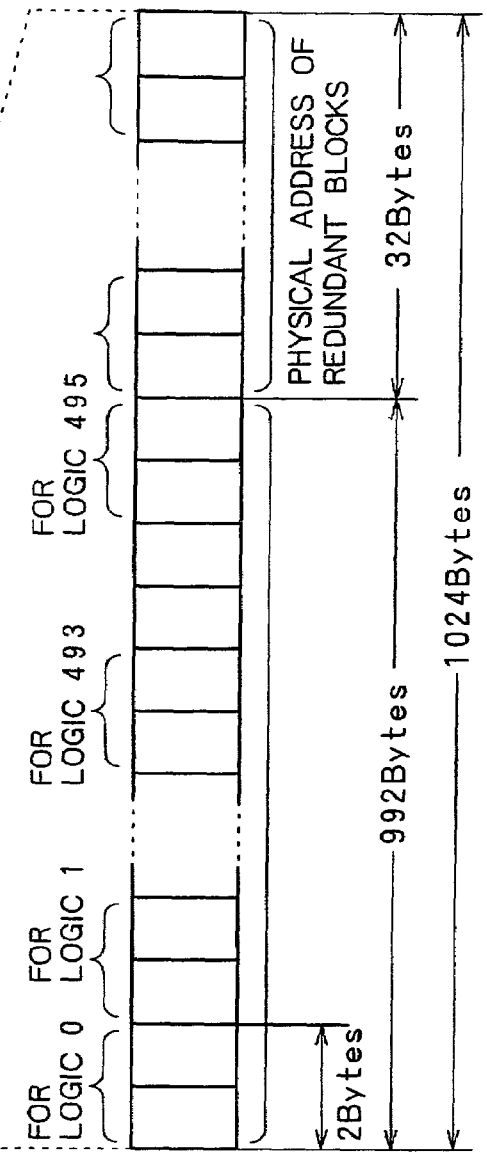
FIG. 12A
FIG. 12B

FIG. 13

| FLASH-MEMORY CAPACITY | BLOCK COUNT | 1-BLOCK CAPACITY | 1-PAGE CAPACITY | LOGICAL/PHYSICAL-ADDRESS TRANSFORMATION TABLE SIZE |
|---|---|---|---|---|
| 4MB | 512 (1 SEGMENT) | 8KB (16 PAGES) | (512+16) B | 1KB (2 PAGES) |
| 8MB | 1024 (2 SEGMENTS) | 8KB (16 PAGES) | (512+16) B | 2KB (4 PAGES) |
| 16MB | 2048 (4 SEGMENTS) | 8KB (16 PAGES) | (512+16) B | 4KB (8 PAGES) |
| | 1024 (2 SEGMENTS) | 16KB (32 PAGES) | (512+16) B | 2KB (4 PAGES) |
| 32MB | 2048 (4 SEGMENTS) | 16KB (32 PAGES) | (512+16) B | 4KB (8 PAGES) |
| 64MB | 4096 (8 SEGMENTS) | 16KB (32 PAGES) | (512+16) B | 8KB (16 PAGES) |
| 128MB | 8192 (16 SEGMENTS) | 16KB (32 PAGES) | (512+16) B | 16KB (32 PAGES) |

FAT CONCEPTUAL DIAGRAM

FIG. 17

DIRECTORY STRUCTURE OF 1 FILE.
EACH NUMBER ENCLOSED IN PARENTHESES IS THE NUMBER OF BYTES.

| FILE NAME (8) | EXTENSION (3) | ATTRIBUTE (1) | RESERVED (10) | TIME (2) | DATE (2) | FIRST CLUSTER (2) | SIZE (4) |
|---|---|---|---|---|---|---|---|

FIG. 26

ENTRY COUNT=4　　　　　　　　　　　　　　　　　　TABLE SIZE=0x1000

| APPLICATION ID | APPLICATION NAME | ACTIVATION COUNT | SAVE FLAG | TEMPORARY ATTRIBUTE | ADDRESS |
|---|---|---|---|---|---|
| 1 | AKIHABARA MAP | 24 | 1 | 0 | NULL |
| 2 | Palmscape | 256 | 0 | 0 | 0x130000 |
| 3 | MultiMail | 384 | 0 | 0 | 0x120000 |
| 4 | GO WITH A LOTTERY | 51 | 0 | 1 | 0x100000 |

INFORMATION-PROCESSING APPARATUS AND INFORMATION-PROCESSING METHOD

BACKGROUND OF THE INVENTION

The present invention relates to an information-processing apparatus and an information-processing method. More particularly, the present invention relates to an information-processing apparatus and an information-processing method wherein an internal storage means is provided and information is input from an external storage unit.

In addition, the present invention relates to processing to install application software in an information-processing apparatus and an information-processing method.

As an internal storage unit provided in an information-processing apparatus such as a personal computer and a PDA (Personal Digital Assistant), there are a solid memory such as a RAM or a flash memory and an HDD (Hard-Disc Drive). As a storage unit external to the information-processing apparatus, it is possible to employ a variety of portable recording media such as an optical disc, an optical-magnetic disc, a magnetic disc and a memory card.

By the way, a PDA apparatus or the like may activate application software and make an access to a data file of a database. The application software, the data file or the database may be stored in an external storage unit. In some cases, the application software, the data file or the database must be once transferred from an external storage unit to an internal storage unit.

When activating application software and making an access to a data file or a database, such an information-processing apparatus forms a judgment as to whether the application software, the data file or the database are stored in the internal or external storage unit. The information-processing apparatus carries out an operation according to the outcome of the judgment. In order to activate application software stored in an external storage unit such as a memory card, for example, the user first carries out an operation to request that the application software be loaded from the memory card. After the application software has been loaded, it is necessary for the user to carry out an operation to activate the loaded software.

The operations are cumbersome for the user. In addition, since the user must always know whether the target information is stored in the internal or external storage unit, the operations are not simple either. Thus, the information-processing apparatus cannot be said to offer good operatability.

Assume that activated application software uses a data file or a database relevant to the software. In this case, in order to open the data file, it is necessary for the user to carry out an operation to specify a location to be searched for the data file or specify a file to be actually used. For example, the user needs to specify a drive name, a directory name or a file name.

For the purpose described above, however, the user must know the location at which the data file or other information to be used is recorded. The user must form a judgment as to whether the data file or the other information is stored in an internal storage unit or an external storage unit such as a memory card and then carry out an operation according to the outcome of the judgment.

In addition, in the case of a portable and compact information-processing apparatus such as a PDA, the size of the internal storage unit is unavoidably limited. Thus, when an application program is installed in the internal storage unit, the storage area becomes full in many cases.

When the user wants to further add (or install) a new application program in such a circumstance, the user needs to delete or save an already installed program or an already installed data file in another storage medium in order to secure a storage area in the internal storage unit. The already installed application program or data file to be saved may be a program no longer needed or not used frequently. Then, it is necessary to carry out an operation to add the new application program to the existing software by installing the program in the secured storage area.

However, stress is much developed in the user by the fact that it is difficult as well as cumbersome to carry out the work to form of a judgment as to whether or not an already installed application program or data file is still required, the fact that it takes labor to carry out the work of deleting an existing application program or data file no longer required or used infrequently and the fact that the work to set a location for saving an application program or a data file and to set a connection to the location is troublesome. It takes also much time to carry out these works. The user's stress and the much time caused by these works are a problem.

SUMMARY OF THE INVENTION

It is thus an object of the present invention addressing the problems described above to allow the user to utilize information such as application software and a data file, which are stored in internal and external storage units, by carrying out simple operations without being aware of whether an area for storing information is the internal or external storage unit.

It is another object of the present invention addressing the problems described above to implement addition of application programs without requiring the user to carry out excessive operations even if the memory resource has a limited size.

It is a further object of the present invention addressing the problems described above to allow the user to utilize application software for allowing data files to be used without bearing an operation load.

To achieve the above object, according to a first aspect of the present invention, there is provided an information-processing apparatus comprising: storage means for storing application programs and data files; calculating means for activating an application program stored in the storage means to carry out predetermined processing; media drive means for recording and playing back information into and from an external recording medium; and control means which controls the media-drive means and the storage means when the external recording medium for recording an application program is mounted on the media drive means so that: when the storage means includes a remaining free storage area with a size large enough for accommodating the application program recorded in the external recording medium, the application program recorded in the external recording medium is installed in the storage means; but when the storage means includes a remaining free storage area with a size not large enough for accommodating the application program recorded in the external recording medium, on the other hand, an application program or a data file stored in the storage means is saved to the external recording medium in order to allocate a free storage area in the storage means and then the application program recorded in the external recording medium is installed in the storage means.

According to a second aspect of the present invention, there is provided an information-processing method comprising: a judgment step of verifying the size of a free storage area available in storage means and the size of a storage area required for accommodating an application program loaded from an external recording medium into the storage means and forming a judgment as to whether or not the application program can be installed in the storage means; a save step of saving an application program or a data file stored in the storage means to the external recording medium in order to allocate a new free storage area in the storage means in the case of outcome of the judgment step indicating that the application program cannot be installed in the storage means; and an installation step of installing the application program recorded in the external recording medium into the storage means having the new free storage area allocated by the save step.

According to a third aspect of the present invention, there is provided an information-processing apparatus comprising: storage means; connection means for exchanging information between the information-processing apparatus and an external recording medium; calculating means for activating application software and carrying out processing based on the application software; and search means for first searching the storage means for a relevant data file to be used by the activated application software, and for searching the external recording medium for the relevant data file through the connection means when the data file is not found in the storage means.

According to a fourth aspect of the present invention, there is provided an information-processing method adopted by a calculating means operating in accordance with a predetermined step to search for a desired file related to processing of the predetermined step, the information-processing method comprising: a search step of searching storage means for the desired file; a connection step of setting a connection to an external recording medium through connection means when the desired file is not found in the storage means; a search step of searching the external recording medium for the desired file after the connection step is set.

According to a fifth aspect of the present invention, there is provided an information-processing apparatus comprising: storage means for storing application software and data files; connection means for exchanging information between the information-processing apparatus and an external recording medium for storing application software and data files; recognition means for recognizing application software or data files, which are stored in the external recording medium connected to the information-processing apparatus by the connection means; user interface means for displaying application software or data files, which are stored in the storage means, displaying application software or data files, which are stored in the external recording medium and recognized by the recognition means, and for allowing a piece of the displayed application software to be selected for activation and for allowing one of the displayed data files to be selected for use; and activation processing control means for loading application software from the external recording medium into the storage means and carrying out processing to activate the loaded application software in response to an operation carried out on the user interface means to make a request for activation of the application software.

According to a sixth aspect of the present invention, there is provided an information-processing method comprising: an activation-detecting step of detecting an operation to activate application software; a judgment step of forming a judgment as to whether application software to be activated which is detected by the activation-detecting step is stored in an storage means or an external recording medium; a loading step of loading application software from the external recording medium in the case of result of the judgment step indicating that the application software is stored in the external recording medium; and an activation step of activating application software loaded on the storage means by the loading step.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A through 1D are diagrams showing a plan view, a right-side view, a left-side view and a top-side view of an information-processing apparatus implemented by an embodiment of the present invention;

FIGS. 8A through 8F are explanatory diagrams each showing a physical data structure of the memory card provided by the embodiment;

FIG. 9 is an explanatory diagram showing management flags of the memory card provided by the embodiment;

FIG. 11 is an explanatory diagram conceptually showing construction of a logical-address/physical-address transformation table provided by the embodiment;

FIGS. 12A and 12B are explanatory diagrams each showing a typical structure of the logical-address/physical-address transformation table provided by the embodiment;

FIG. 13 is an explanatory diagram showing relations between the flash memory capacity of the memory card provided by the embodiment, the number of blocks per segment, a block size, a page size and the size of the logical-address/physical-address transformation table;

FIG. 17 is an explanatory diagram showing contents of a directory;

FIG. 26 is an explanatory diagram showing an activation-history table provided by the embodiment;

PREFERRED EMBODIMENT OF THE INVENTION

Figure 2:
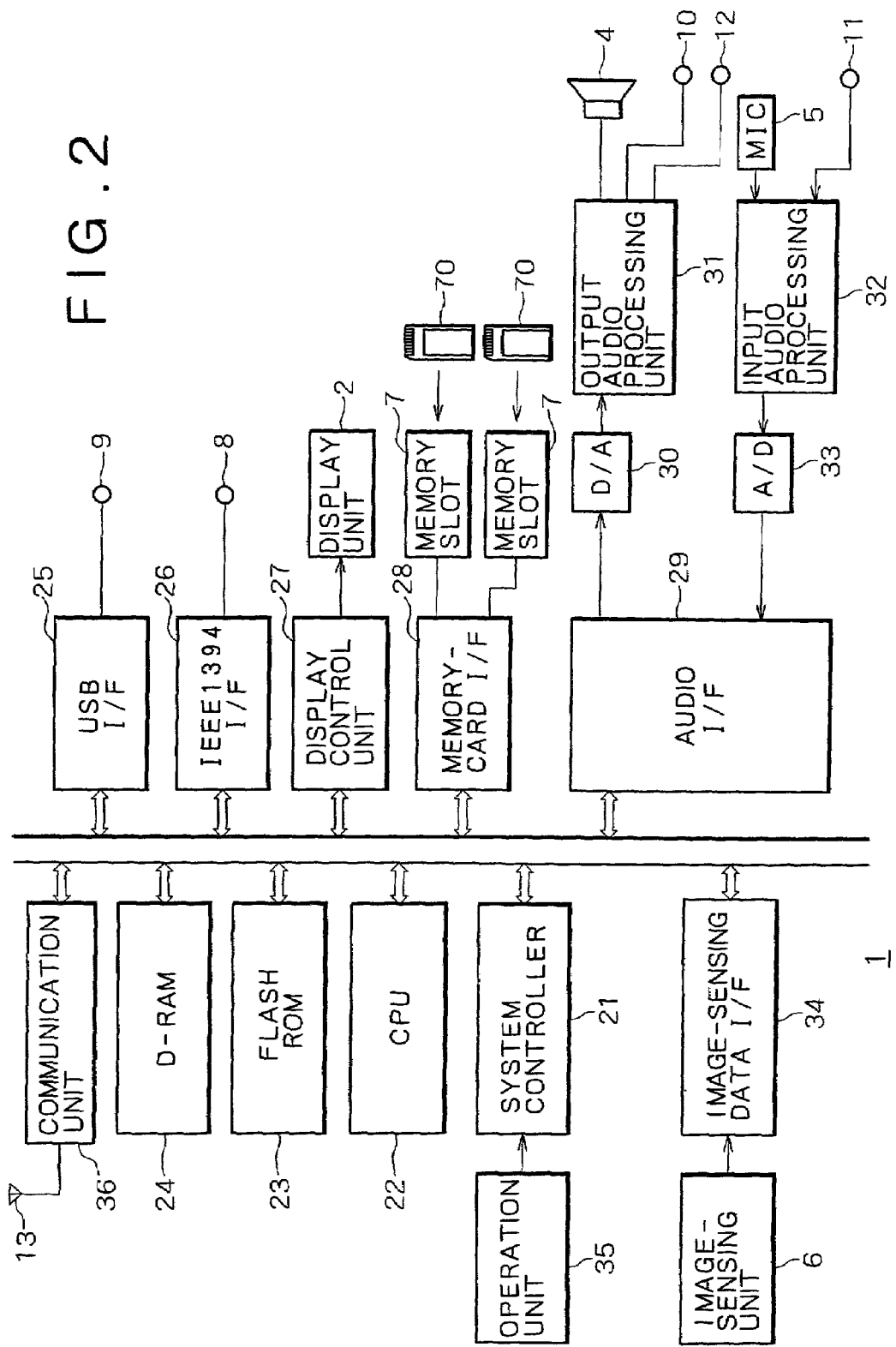
FIG. 2 is a block diagram showing the internal configuration of the information-processing apparatus implemented by the embodiment.

A preferred embodiment of the present invention is explained in an order given below. An information-processing apparatus implemented by the embodiment is an information-processing apparatus functioning as the so-called PDA (Personal Digital Assistant). Examples of the external storage apparatus are a memory card and a server connected to the information-processing apparatus by a communication network.

1: External Appearance of the Information-processing Apparatus
2: Configuration of the information-processing apparatus
3: Structures of the OS and the Database
4: Memory Cards
4-1: External Appearance
4-2: Terminals and Internal Structure of the Memory Card
4-3: Processing Hierarchy of the File System
4-4: Physical Data Structure
4-5: Concepts of the Physical Address and the Logical Address
4-6: Logical-Address/Physical-Address Transformation Table
4-7: Directory Structure
5: FAT Structure
6: Interface between the Memory Card and the Information-Processing Apparatus
7: Processing at Mounting of the Memory Card
8: Activation of an Application Program and Reference to Data
9: Typical Server Connected by a Communication Network
10: File Search Processing 1: External Appearance of the Information-Processing Apparatus FIGS. 1A through 1D are diagrams each showing a typical external appearance of an information-processing apparatus 1 implemented by the embodiment.

The information-processing apparatus 1 is a compact, light and portable apparatus functioning as the so-called PDA. A memory card 70 to be described later is mounted on the information-processing apparatus 1 as a recording medium. Data can be recorded and played back into and from the memory card 70.

It should be noted that the scope of the present invention is not limited to a portable information-processing apparatus. Instead, the present invention can be applied to information-processing apparatuses of all types represented mainly by the personal computer. In addition, recording media used by the information-processing apparatus 1 for recording data are not limited to the memory card 70. The recording media include a variety of other recording media such as a magnetic disc employed in an HDD (Hard-Disc Drive), an optical disc, a magneto-optical disc, a RAM (Random-Access Memory) and a flash memory permanently installed in the information-processing apparatus 1.

FIGS. 1A, 1B, 1C and 1D are diagrams showing respectively a plan view, a right-side view, a left-side view and a top view of a typical external appearance of the information-processing apparatus 1.

As shown in FIG. 1D, memory slots 7 are created on the top-surface side of the information-processing apparatus 1. The memory slots 7 are each used for mounting a memory card 70 on the information-processing apparatus 1. The information-processing apparatus 1 is capable of recording and playing back various kinds of data into and from a memory card 70. The types of data includes computer data, music data, audio data, moving-picture data, still-picture data and control data.

It should be noted that, in the information-processing apparatus 1 shown in FIGS. 1A through 1D, that 2 memory cards 70 can be mounted at the same time on the 2 memory slots 7 respectively. It is needless to say that the number of memory slots 7 does not have to be 2. It can be 1 or 3 or greater.

On the front surface of the information-processing apparatus 1, a display unit 2 implemented by typically a liquid-crystal panel is created. The display unit 2 is used for displaying various kinds of information such as pictures accompanying activation of application software and accompanying various kinds of processing, data in the form of pictures and characters, information added to a playback audio signal and added to playback music, a guide message giving an instruction as to how to carry out an operation and a menu screen for selecting playback and edit operations or the like.

The information-processing apparatus 1 is provided with a variety of operators to be operated by the user. The operators include main members such as operation keys 3a, a jog dial 3b and a push dial 3c. The user is capable of carrying out a variety of necessary operations including an operation to turn on the power supply, an operation to operate a menu and select an item from the menu and an operation to enter data such as characters by operating these operators.

These operation keys 3a, the jog dial 3b and the push dial 3c are no more than typical operators. To be more specific, the number of operators, the types of the operators and their locations can be changed in a variety of conceivable ways.

In addition, the information-processing apparatus 1 also includes a speaker 4, a microphone 5 and an image-sensing unit 6. The speaker 4 is used for outputting a voice and/or a sound while the microphone 5 is used for inputting a voice and/or a sound. The image-sensing unit 6 is used for taking in an image-sensed picture.

Furthermore, a variety of terminals are provided for connecting the information-processing apparatus 1 to various kinds of equipment. For example, the terminals include a headphone terminal 10, a line-output terminal 12 and a line-input terminal 11 as shown in FIG. 1B. Moreover, as shown in FIG. 1C, an IEEE-1394 terminal 8 and a USB (Universal Serial Bus) terminal 9 are provided as well.

It should be noted that these terminals can have a variety of conceivable types and be located at different possible locations. The number of terminals may also vary from application to application.

For example, digital input/output terminals may also be provided for optical cables. It is also possible to provide other terminals such as an SCSI (Small Computer System Interface) connector, a serial port or an RS232C connector.

In addition, in the case of this information-processing apparatus 1, information can be downloaded from a predetermined server or the Internet through a communication network such as a public network. An antenna 13 provided in this information-processing apparatus 1 is used for establishing a radio communication with a base station of a communication network.

2: Configuration of the Information-processing Apparatus

FIG. 2 is a diagram showing the internal configuration of the information-Processing apparatus 1.

As shown in the figure, the information-processing apparatus 1 includes internal core members such as a system controller 21, a CPU (Central Processing Unit) 22, a flash ROM (Read-Only Memory) 23 and a D-RAM (Dynamic RAM) 24. In addition, the information-processing apparatus 1 also includes an operation unit 35, a display control unit 27 and a display unit 2, which each serve as a basic interface with the user.

The system controller 21 inputs information on an operation from the operation unit 35. Receiving the input, the system controller 21 interrupts the CPU 22.

The operation unit 35 corresponds to the operation keys 3a, the jog dial 3b and the push dial 3c, which are shown in FIGS. 1A through 1D. In addition, the display unit 2 also displays operation keys and icons. The displayed operation keys and icons are not described in the explanation with reference to FIGS. 1A through 1D. The display unit 2 also has a touch-detecting function using touch panel operators. In this case, the touch panel operators are included in the operation unit 35 shown in FIG. 2.

The CPU 22 is a member that executes basic software called an OS (Operating System) and application programs.

The CPU 22 carries out necessary processing according to information on an operation. The information is supplied to the CPU 22 through the system controller 21.

The flash ROM 23 is used for storing a basic-operation program, a variety of processing constants and setting information among other data.

The D-RAM 24 is used for storing information required in various kinds of processing. The D-RAM 24 also serves as a data buffer and an extension of a work area of the CPU 22. In addition, the D-RAM 24 is used for a number of purposes in dependence on processing carried out by the CPU 22. The D-RAM 24 includes a storage area which is a non-volatile area. In this storage area, the OS and application software are installed.

The user invokes the application software installed in the D-RAM 24 by carrying out an operation. Then, the CPU 22 executes the invoked application software.

The application software has a user-interface screen displayed by rendering a picture in a frame buffer allocated in the D-RAM 24. The picture rendering is based on a state transition triggered by a command issued by the user.

The rendered-picture data is transferred to a display control unit 27 to be eventually displayed on the display unit 2.

In addition, the memory slots 7 are created for memory cards 70 as described earlier, allowing the memory cards 70 to be mounted on the information-processing apparatus 1. The CPU 22 is capable of making an access to any of the memory cards 70 through a memory-card interface 28 in write and read operations. Interface operations between the memory-card interface 28 and the memory cards 70 will be described later.

The CPU 22 is capable of using any of the memory cards 70 mounted on the memory slots 7 as a memory-area extension.

In addition, it is needless to say that an application program stored in one of the memory cards 70 can be installed in the D-RAM 24. As an alternative, by loading an application and data from one of the memory cards 70 into the D-RAM 24, necessary processing can be carried out.

Furthermore, by executing a desired application program, the CPU 22 is capable of recording various kinds of data such as created text data, picture data, audio data and tabulated data into one of the memory cards 70.

It should be noted that, when the information-processing apparatus 1 detects an operation to mount a memory card 70 on one of the memory slots 7, the information-processing apparatus 1 allows recording and playback operations to be carried out on the memory card 70 or performs the so-called hot plug-in operation wherein an application program and data stored in the memory card 70 are automatically expanded in the D-RAM 24.

As an alternative, in a hot plug-in operation, when a memory card 70 containing an application program and a data file is mounted on the information-processing apparatus 1, the CPU 22 installs the application program and the data file recorded in the memory card 70 into the D-RAM 24, automatically activating the application program.

It should be noted that the information-processing apparatus 1 implemented by this embodiment is not capable of activating an application program stored in a memory card 70 unless the program is expanded in the CPU 22 first.

The memory-card interface 28 is capable of encoding data to be stored in the memory card 70 and decoding data read out from the memory card 70.

The image-sensing unit 6 typically comprises a CCD image-sensing device and an image-sensing circuit system.

Data of an image-sensed picture taken by the image-sensing unit 6 can be stored in the D-RAM 24 by way of an image-sensed-data interface 34. By execution of predetermined application programs, the CPU 22 is capable of editing data of an image-sensed picture and recording the data into the memory card 70.

An audio interface 29 is an interface member for outputting data to the speaker 4, the headphone terminal 10 and the line-output terminal 12 as well as inputting data from the microphone 5 and the line-input terminal 11.

For example, an analog audio signal input from the microphone 5 or the line-input terminal 11 is subjected to predetermined amplification and predetermined filtering in an input-audio-processing unit 32. A signal output by the input-audio-processing unit 32 is converted by an A/D converter 33 into digital audio data, which is then supplied to the audio interface 29. Controlled by the CPU 22, the audio interface 29 processes the digital audio data received from the A/D converter 33. Typically, the digital audio data is subjected to a compression and encoding process in the audio interface 29. The audio interface 29 outputs a result of the process to the memory-card interface 28 to be recorded in the memory card 70. On the other hand, the audio interface 29 carries out a predetermined decoding process on digital audio data read out and supplied from the memory card 70 and supplies a result of decoding to a D/A converter 30 for converting the digital audio data into an analog audio signal. An output-audio-processing unit 31 carries out predetermined processes such as amplification and impedance adjustment, which conform to an output destination of the signal, on the analog audio signal received from the D/A converter 30. The output destination of a signal produced by the output-audio processing unit 31 can be the speaker 4, the headphone terminal 10 or the line-output terminal 12.

A USB interface 25 is a communication interface for interfacing with an external apparatus connected to a USB connector 9. The CPU 22 is capable of communicating data with a personal computer connected externally or another external apparatus such as a peripheral apparatus through the USB interface 25. Examples of data communicated between the CPU 22 and an external apparatus through the USB interface 25 are application software and a data file, which are handled in the information-processing apparatus 1. A data file contains typically picture data and audio data.

By the same token, an IEEE-1394 interface 26 is a communication interface for interfacing with an external apparatus connected to an IEEE-1394 connector 8. The CPU 22 is capable of communicating various kinds of data with the external apparatus through the IEEE-1394 interface 26.

A communication unit 36 is a member for communicating information with an external server, an Internet home page or the like through typically a communication network to be described later by referring to FIG. 24. Particularly in the case of this embodiment, the information-processing apparatus 1 is capable of downloading application software and data files from typically an external server through the communication unit 36.

The information-processing apparatus 1 implemented by this embodiment is exemplified as a radio communication terminal communicating with a communication network. It should be noted, however, that the information-processing apparatus 1 can also be provided with a modem or a connection terminal connected to a public telephone network by a wire.

In addition, the information-processing apparatus 1 can be not only connected by a public line to an external server or the like, from which application software and data files can be downloaded, but also connected to typically a server system or a terminal in a communication system by a dedicated line.

It should be noted that the configuration of the information-processing apparatus 1 shown in FIG. 2 is typical to the bitter end. That is to say, configurations of the information-processing apparatus 1 are not limited to the one shown in the figure. For example, it is possible to add a variety of configuration members employed generally in a personal computer or a PDA apparatus to the configuration, or eliminate members each serving as a component not actually needed from the configuration.

3: Structures of the OS and the Database

Figure 3:
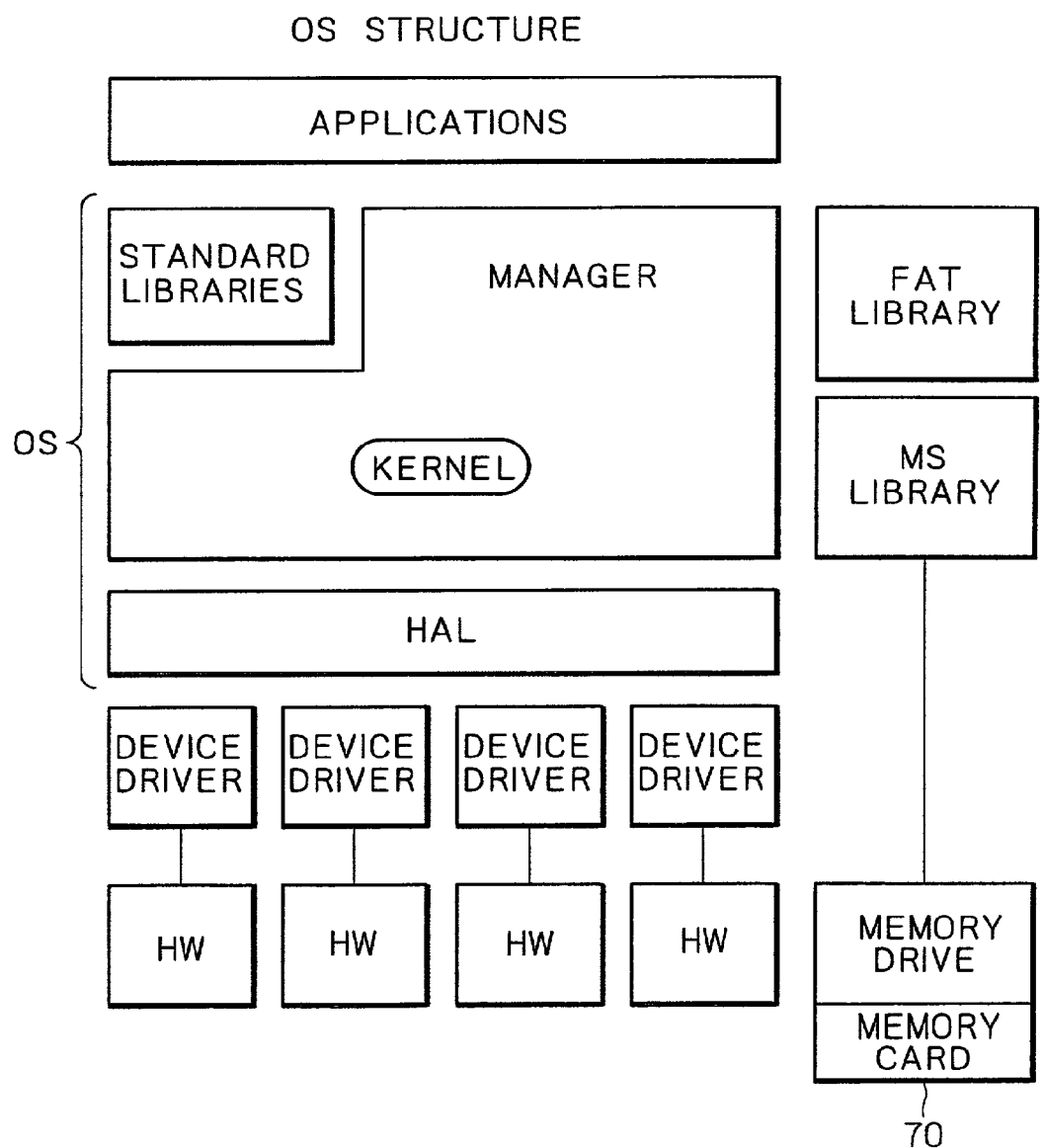
FIG. 3 is an explanatory diagram showing the structure of an OS installed in the information-processing apparatus implemented by the embodiment.

The following description explains the structure of an OS installed in the information-processing apparatus 1 by referring to FIG. 3. As shown in FIG. 3, the OS which is basic software comprises a manager layer including a kernel serving as the nucleus of the OS, standard libraries and an HAL (Hardware Abstract Layer). The HAL is a layer of hardware such as a control IC.

Application software is executed under basic operations of such an OS configuration.

A device driver or a plurality of device drivers are provided for the HAL, forming a layer. Each of the device drivers drives actual hardware (HW) with which the device driver is associated.

Particularly, in the case of the information-processing apparatus 1 implemented by the embodiment, the memory card 70 can be driven by a device driver. Since data stored in the memory card 70 is managed by using a FAT (File Allocation Table) system as will be described later, the OS includes a FAT library. The OS also has an MS library for handling memory cards 70.

Thus, a configuration for driving memory cards 70 comprises a FAT library, an MS library and a device driver known as a memory driver.

In the information-processing apparatus 1 implemented by the embodiment to have such an OS structure, a database concept is introduced as a concept corresponding to what is normally called a file.

The technical term database used in this description is not what is normally called a database used merely for storing data, but a database with a formatted structure wherein the database itself is capable of managing data. In this meaning, the database corresponds to a file.

Figure 4:
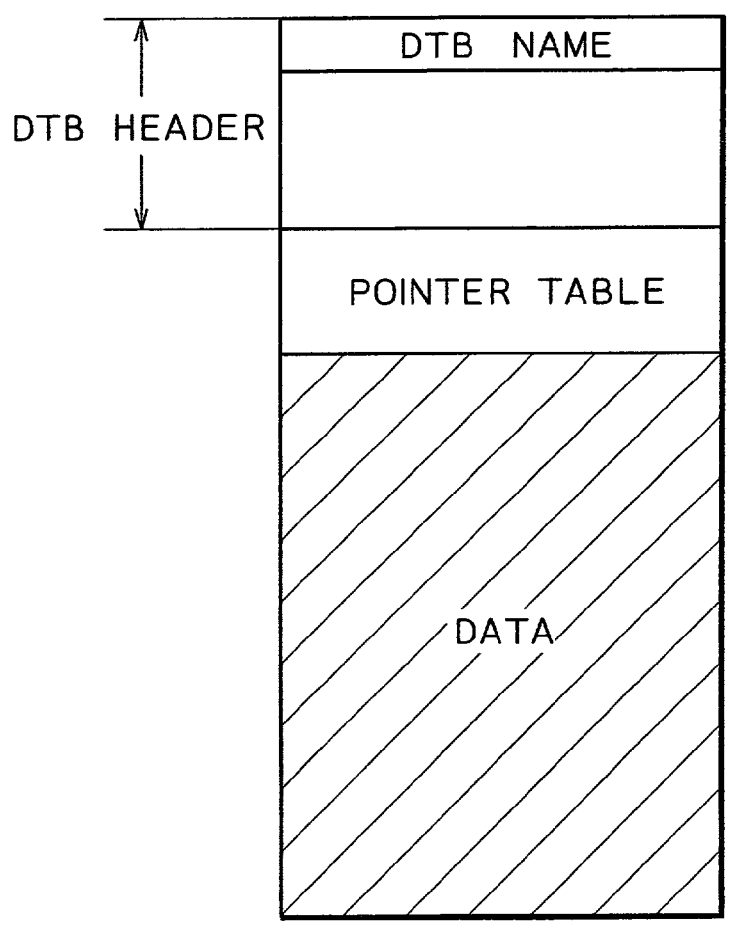
FIG. 4 is an explanatory diagram showing the structure of a database handled in the information-processing apparatus implemented by the embodiment.

FIG. 4 is a diagram showing the structure of a database. As shown in the figure, the database comprises a header (DTB header), a pointer table and a data area for storing actual data. The DTB header includes a database name (DTB name) and an area for storing other information. Locations of pieces of actual data stored in the data area are managed by pointers stored in the pointer table.

There are 2 types of database with such a structure. For example, in general, a piece of application software comprises a plurality of files, namely, an execution file named *.exe and a data file named *.data. A resource database named *.prc corresponds to the execution file *.exe and a database database named *.dtb corresponds to the data file *.data.

In the information-processing apparatus 1 implemented by this embodiment, data is handled by adopting such a concept of database. Thus, a file recorded into or played back from a memory card 70 or a file handled by the FAT file system is treated as a database.

The technical term file used in this specification means a file conforming to the general concept. In this embodiment, a file means a database with the structure described above.

4: Memory Cards 4-1: External Appearance

Figure 5:
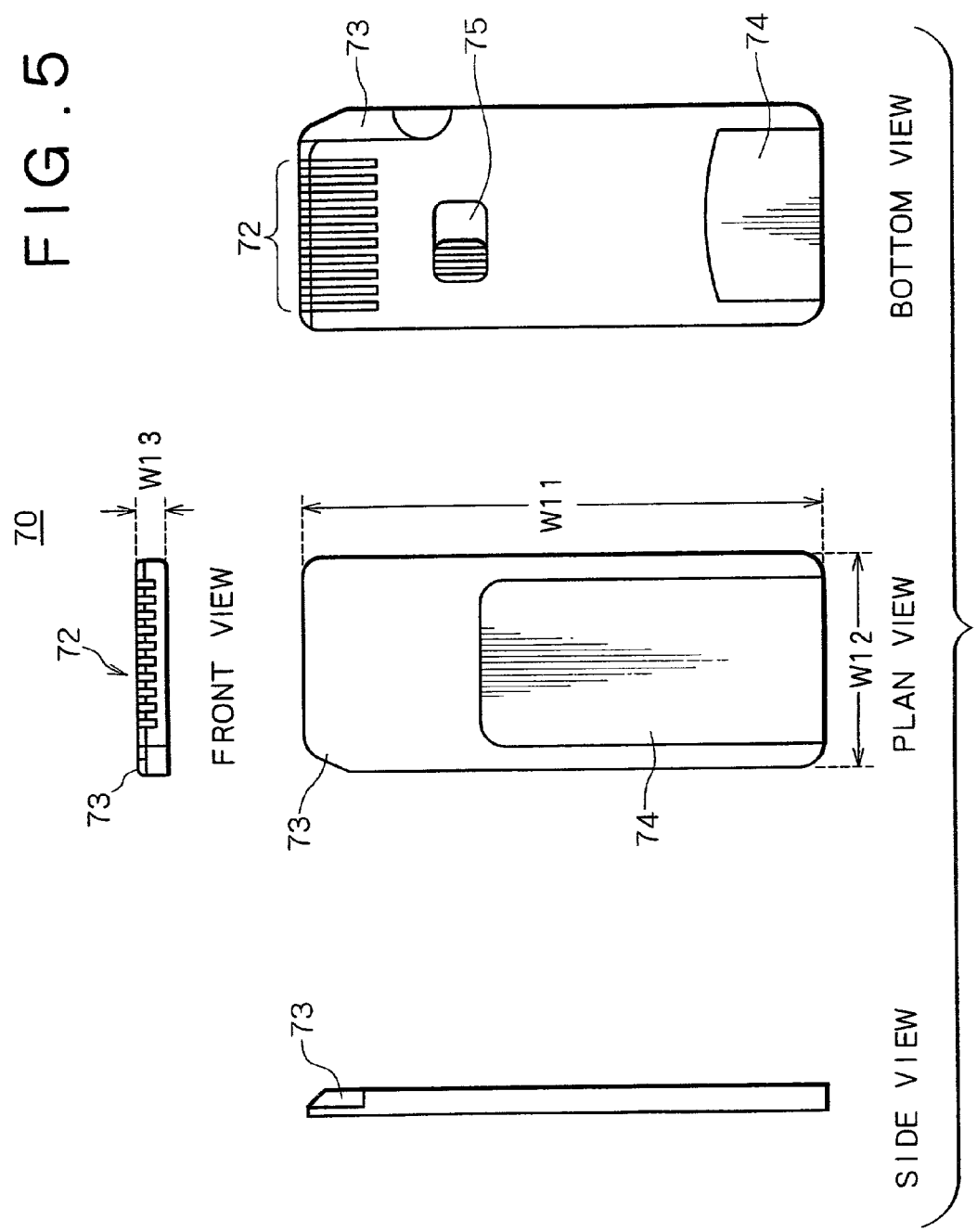
FIG. 5 is a diagram showing the plan view, the front view, the side views and the bottom view of an external appearance of a memory card provided by the embodiment.

Next, the memory card 70 is explained. FIG. 5 is a diagram showing an external appearance of the memory card 70. The memory card 70 includes a memory device typically having a predetermined capacity in a case having a planar shape like one shown in FIG. 5. In this embodiment, a flash memory is used as the memory device.

FIG. 5 shows the plan view, the front view, the side view and the bottom view. The case is typically formed by adoption of a plastic molding technique. As concrete typical dimensions, the case has a depth W11 of 60 mm, a width W12 of 20 mm and a thickness W13 of 2.8 mm as shown in the figure.

A terminal unit 72 has typically 10 electrodes provided on the lower portion of the front surface, being oriented toward the bottom side of the case. Data is read out from and written into the memory device inside the case through the terminal unit 72. A cut 73 is provided on the left upper portion of the case in a direction parallel to a planar surface. The cut 73 prevents the memory card 70 from being inserted incorrectly when placing the memory card 70 on a mounting & dismounting mechanism of the drive main body. A label-sticking surface 74 is spread from the top of the case to the bottom thereof, allowing the user to stick a label thereon. A slide switch 75 is provided on the bottom side for preventing data stored in the memory device from being inadvertently deleted.

In such a memory card 70, the capacity of the flash memory is prescribed to be 4 MB (mega bytes), 8 MB, 16 MB, 32 MB, 64 MB 128 MB.

The so-called FAT file system cited above is used as a file system for recording and playing back data.

The write speed is set at a value in the range of 1,500 Kbyte/sec to 330 Kbyte/sec and the read speed is set at 2.45 Mbyte/sec. The write unit is set at 512 bytes and the size of each deleted block is set at 8 KB or 16 KB. The voltage of the power supply is set at a value in the range of 2.7 V to 3.6 V and the maximum frequency of a serial clock signal SCLK is set at 20 MHz.

4-2: Terminals and Internal Structure of the Memory Card

Figure 6:
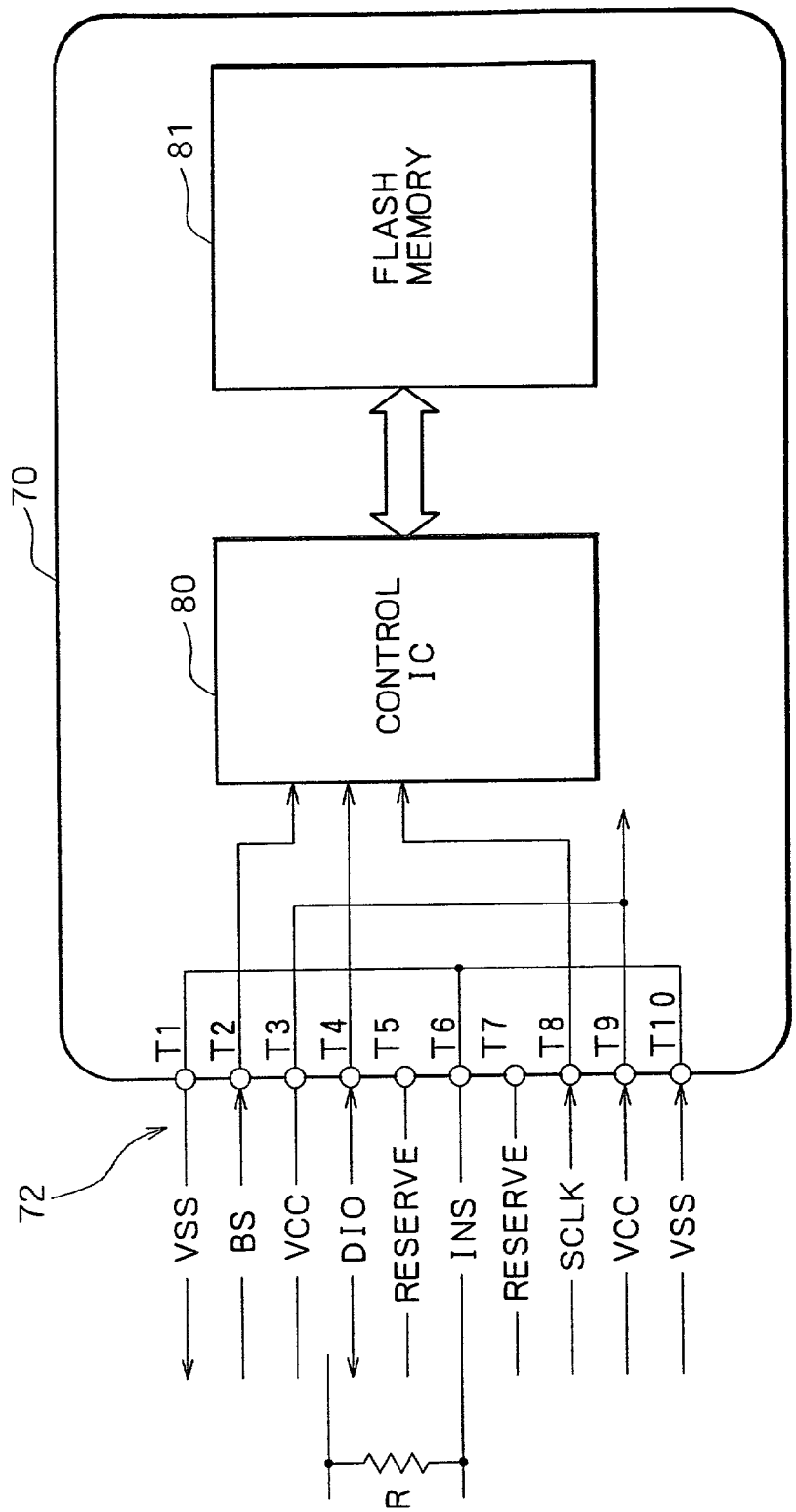
FIG. 6 is an explanatory diagram showing the internal structure of the memory card provided by the embodiment.

FIG. 6 is a diagram showing the electrode structure of the terminal unit 72. As shown in FIG. 5, the terminal unit 72 has a structure comprising an array of 10 planar electrodes. The electrodes shown in FIG. 6, that is, the terminals T1 to T10, are described as follows.

The terminals T1 and T10 are detected-voltage-Vss terminals. The terminal T2 is an input terminal for receiving a serial protocol bus state signal BS. The terminals T3 and T9 are power-supply-voltage-Vcc terminals. The terminal T4 is a data terminal serving as an input/output terminal for inputting and outputting a serial protocol data signal. The terminals T5 and T7 are each a reserved terminal. The terminal T6 is a detection terminal to detect mounting of a memory card on the drive, to be more specific, on the memory-card interface 28 of the information-processing apparatus 1. The terminal T8 is an input terminal for receiving a serial clock signal SCLK.

FIG. 6 also shows the internal configuration of the memory card 70. As shown in the figure, the internal configuration of the memory card 70 comprises a control IC 80 and a flash memory 81. The control IC 80 is a member for carrying out operations to read out data from and write data into the flash memory 81.

As is obvious from the figure, a serial protocol bus state signal BS and a serial protocol clock signal SCLK are supplied to the control IC 80 by way of the terminal T2 and the terminal T8 respectively. In a write operation, the control IC 80 writes data supplied to the terminal T4 into the flash memory 81 in accordance with the serial protocol bus state signal BS and the serial protocol clock signal SCLK. In a read operation, on the other hand, the control IC 80 reads out data from the flash memory 81 in accordance with the serial protocol control bus state signal BS and the serial protocol clock signal SCLK, supplying the data to the drive unit by way of the terminal T4.

A detection voltage Vss is supplied to a detection terminal T6. The drive unit detects the voltage appearing at the detection terminal T6 through a resistor R as shown in the figure to form a judgment as to whether or not the memory card 70 has been placed on a mounting unit (the memory slot 7).

4-3: Processing Hierarchy of the File System

The following description explains a format in a system wherein the memory card 70 is used as a recording medium.

Figure 7:
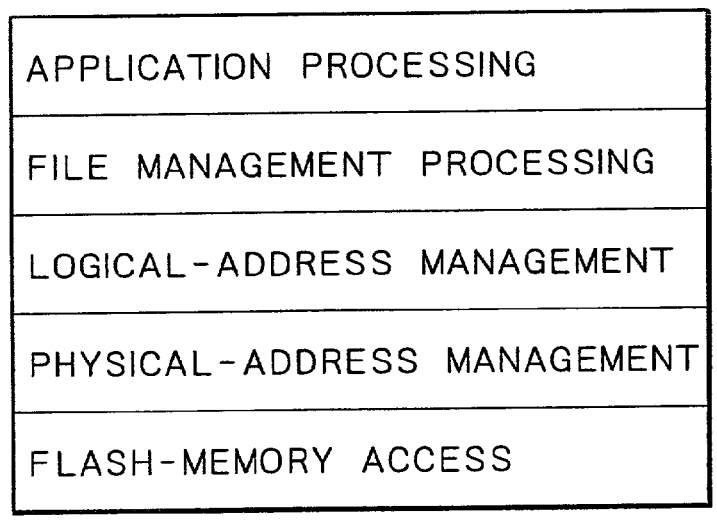
FIG. 7 is an explanatory diagram showing a processing hierarchy of a file system provided by the embodiment.

FIG. 7 is an explanatory diagram showing a processing hierarchy of a file system in a system using the memory card 70 as a recording medium. As shown in the figure, the processing hierarchy of the file system comprises an application processing layer on the top. The application processing layer is followed sequentially by a file management processing layer, a logical-address management layer, a physical-address management layer and a flash-memory access layer. The file management processing layer of the processing hierarchy is the so-called FAT (File Allocation Table).

In addition, as is obvious from the figure, in the file system of this embodiment, there are introduced logical-address and physical-address concepts to be described later.

4-4: Physical Data Structure

FIGS. 8A through 8F are explanatory diagrams each showing a physical data structure of the flash memory 81 which serves as a storage device in the memory card 70.

A segment having a fixed size is a root data unit in the storage area of the flash memory 81. A segment is prescribed to have a size of 4 MB (Mega Byte) or 8 MB. The number of segments in the flash memory 81 varies in dependence on the capacity of the flash memory 81.

As shown in FIG. 8A, 1 segment is divided into blocks which are each a data unit having a size of 8 KB (Kilo Byte) or 16 KB. As a rule, 1 segment consists of 512 blocks. As shown in FIG. 8A, the last block in the segment is block n where n=511. In the flash memory 81, however, a number of blocks can be used as a defective area, that is, an area into which data cannot be written, provided that the number of blocks is within a predetermined allowable range. Thus, the number of truly effective blocks which data can be written into is smaller than 512 or n<511.

Let blocks 0 to n compose a segment as shown in FIG. 8A. The first 2 blocks, namely, blocks 0 and 1, are boot blocks. In actuality, however, not all blocks 0 to n are valid. Since the boot blocks are the first 2 of the valid blocks, the boot blocks are not necessarily guaranteed to be blocks 0 and 1. The remaining blocks are user blocks used by the user for storing user data.

As shown in FIG. 8D, 1 block is divided into pages 0 to m. As shown in FIG. 8E, a 1 page consists of a data area of 512 bytes and a redundant portion of 16 bytes. Thus, the size of 1 page is fixed at 528(=512+16) bytes. It should be noted that the structure of the redundant portion will be described later by referring to FIG. 8F. The number of pages in a block with a size of 8 KB is 16 and the number of pages in a block with a size of 16 KB is 32.

The block structure shown in FIG. 8D and the page structure shown in FIG. 8E are applicable to all the boot blocks and all the user blocks, which are shown in FIG. 8A.

Data is read out from the flash memory 81 and written into the flash memory 81 in page units. However, data is erased from the flash memory 81 in block units. Data is always written into only a page which data that has been erased from. Thus, in actuality, data can be written into a block and data of a block can be updated.

As shown in FIG. 8B, the first one of the boot blocks includes a header in page 0 and information on the position of initial bad data in page 1. Information on a position is referred to as an address. The first block also includes information called a CIS/IDS. As shown in FIG. 8C, the second one of the boot blocks contains a backup of information included in the first one of the boot blocks.

The 16-byte redundant portion shown in FIG. 8E has a structure shown in FIG. 8F. As shown in FIG. 8F, the first bytes of the redundant portion, namely, bytes 0 to 3, are an overwrite area which can be rewritten in dependence on updating of data in the data area. Byte 0 of the overwrite area contains block status. Byte 1 contains data status called block flag data. Predetermined high-order bits of Byte 2 is a transformation-table flag called page data status 1.

As a rule, information stored in bytes 3 to byte 15 is fixed data depending on data of the page. That is to say, the information cannot be changed. Byte 3 contains block information indicating, for example, whether or not the data of the page can be accessed and whether or not an operation to copy the data is inhibited. A 2-byte area consisting of bytes 4 and 5 is a logical address to be described later. A 5-byte area consisting of bytes 6 to 10 is a reserved area of the format. A 2-byte area consisting of bytes 11 and 12 is dispersed information ECC for implementing error correction on the reserved area of the format. The remaining area consisting of bytes 13 to 15 is data ECC for implementing error correction on data stored in the data area shown in FIG. 8E.

Contents of bits 0 to 7 of byte 3 serving as a management flag in the redundant portion shown in FIG. 8F are defined as shown in FIG. 9. First of all, bits 7, 6, 1 and 0 are reserved or undefined. A value of 1 set as a flag in bit 5 indicates that a right to make an access to the block is valid. That is to say, that the block is accessible or free. On the other hand, a value of 0 set as a flag in bit 5 indicates that a right to make an access is invalid. That is to say, that the block is inaccessible or read-protected. A value of 1 set as a flag in bit 4 indicates that a right to copy data of the block is valid. That is to say, an operation to copy the data is OK. On the other hand, a value of 0 set as a flag in bit 4 indicates that a right to copy the data is invalid. That is to say, an operation to copy the data is NG.

Bit 3 is a transformation-table flag. This transformation-table flag is an identifier indicating whether or not the block is used for recording a logical-address/physical-address transformation table to be described later. To be more specific, a value of 0 set in bit 3 indicates that the block is used for recording a logical-address/physical-address transformation table. On the other hand, a value of 1 set in bit 3 indicates invalidity, that is, the block is not used for recording a logical-address/physical-address transformation table.

Bit 2 is a system flag. A value of 1 set in the system flag indicates that the block is a user block. On the other hand, a value of 0 set in the system flag indicates that the block is a boot block.

Relations among the segment, the block and the capacity of the flash memory 81 are explained by referring to the 3 left columns of a table shown in FIG. 13. As described earlier, the capacity of the flash memory 81 in a memory card 70 is prescribed to be 4 MB, 8 MB, 16 MB, 32 MB, 64 MB or 128 MB.

In the case of the smallest capacity of 4 MB, 1 block is prescribed to have a size of 8 KB and the number of blocks per segment is 512. Thus, the flash memory 81's capacity of 4 MB is just equal to the size of 1 segment. In the case of the capacity of 8 MB and the block size of 8 KB, the flash memory 81 comprises 2 segments which together consist of 1,024 blocks. As described above, a block with a size of 8 KB consists of 16 pages.

In the case of the capacity of 16 MB, however, 1 block can be prescribed to have a size of 8 KB or 16 KB. Thus, in the case of the block size of 8 KB, a flash memory with the capacity of 16 MB consists of 2,048 blocks or 4 segments each consisting of 512 blocks. In the case of the block size of 16 KB, on the other hand, a flash memory with the capacity of 16 MB consists of 21,024 blocks or 2 segments which together consist of 1,024 blocks. As described above, a block with a size of 16 KB consists of 32 pages.

In the case of the capacities of 32 MB, 64 MB and 128 MB, however, 1 block can be prescribed to have a size of 16 KB only. Thus, a flash memory with the capacity of 32 MB consists of 2,048 blocks or 4 segments and a flash memory with the capacity of 64 MB consists of 4,096 blocks or 8 segments. A flash memory with the capacity of 128 MB consists of 8,192 blocks or 16 segments.

4-5: Concepts of the Physical Address and the Logical Address

Figure 10:
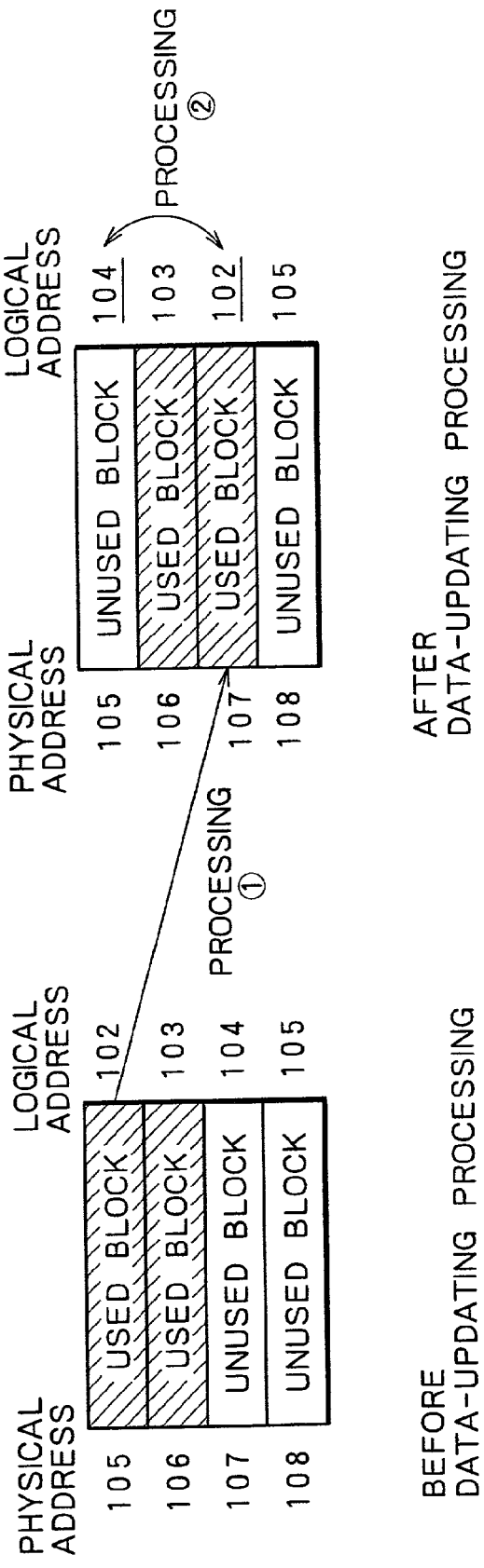
FIGS. 10A and 10B are explanatory diagrams showing a data-updating process carried out in the memory card provided by the embodiment as well as concepts of physical and logical addresses in the memory card provided by the embodiment.

On the basis of the physical data structure described earlier, concepts of the physical address and the logical address in the file system of this embodiment are described by referring to operations to rewrite data as shown in FIGS. 10A and 10B.

As shown in FIG. 10A, 4 blocks are extracted from a segment and used as a model in the following explanation.

A physical address is assigned to each of the blocks. A physical address assigned to a block is a sequence number indicating the location of the block in a physical array of the blocks. The relation between a block and a physical address assigned to the block does not change. In the example shown in FIG. 10A, physical addresses of 105, 106, 107 and 108 are assigned respectively to the 4 blocks starting with the top one. It should be noted that an actual physical address occupies 2 bytes.

As shown in FIG. 10A, data is stored in blocks at the physical addresses of 105 and 106. On the other hand, blocks at the physical addresses of 107 and 108 are unused blocks which no data is recorded in or data has been deleted from.

A logical address is assigned to data stored in a block. A logical address is an address used in the FAT file system to be described later. In the example shown in FIG. 10A, logical addresses of 102, 103, 104 and 105 are assigned respectively to the 4 blocks starting with the top one. It should be noted that an actual logical address also occupies 2 bytes.

Assume that data stored at the physical address of 105 shown in FIG. 10A is updated, that is, the data is rewritten or partially deleted. In this case, the file system of the flash memory 81 does not write new data into the block at the physical address of 105, but into an unused block. That is to say, the data stored at the physical address of 105 is deleted and the new data is stored in the block at the physical address of 107 as shown in FIG. 10B in processing ɨj. The block at the physical address of 107 was an unused block as shown in FIG. 10A.

In processing 2j shown in FIG. 10B, the association of the logical addresses with the physical addresses is updated so that the logical address of 102 associated so far with the physical address of 105 as shown in FIG. 10A is now associated with the physical address of 107 at which the new data is stored. As another result, the logical address of 104 associated so far with the physical address of 107 as shown in FIG. 10A is now associated with the physical address of 105 as shown in FIG. 10B.

As is obvious from the above description, physical addresses are each assigned uniquely to a block. On the other hand, a logical address can be regarded as an address assigned uniquely to a piece of block data which can be stored temporarily in a block and moved later to another block.

By swapping data among blocks as described above, operations to make an access to the same storage area or the same block can be prevented from being concentrated at the same storage area or the same block. Thus, it is possible to prolong the life of the flash memory 81 which has a limit on the number of permissible rewrite operations.

In addition, in spite of the fact that the location of a block of pre-updating data is different from the location of a block of post-updating data, due to the processing 2j to swap a logical address, from the FAT-system point of view, the pre-updating data and the post-updating data are stored at the same logical address to which subsequent accesses can be made.

It should be noted that the swap processing is prescribed to swap a logical address among blocks pertaining to the same segment in order to simplify control to update data in a logical-address/physical-address transformation table to be described later. Conversely speaking, a logical address is not to be swapped among blocks in different segments in the swap processing.

4-6: Logical-Address/Physical-address Transformation Table

As is obvious from FIGS. 10A and 10B, by carrying out processing to swap a logical address among blocks, the association of physical addresses with logical addresses is changed. Thus, a logical-address/physical-address transformation table showing the association of physical addresses with logical addresses is required in making an access to the flash memory 81 in order to write or read out data into or from the flash memory 81. That is to say, the FAT system refers to the logical-address/physical-address transformation table in order to transform a logical address specified by the FAT system into a physical address assigned to the logical address and allows an access to be made to a block indicated by the physical address. Conversely speaking, if such a logical-address/physical-address transformation table does not exist, it will be impossible to make an access to the flash memory 81 by using the FAT system.

In the conventional information-processing apparatus, when the memory card 70 is mounted on the drive main body, a microprocessor employed in the drive main body checks data stored in the memory card 70 to create a logical-address/physical-address transformation table in the drive main body, and stores the table in a RAM employed in the drive main body. That is to say, the memory card 70 itself does not include a logical-address/physical-address transformation table. In the case of this embodiment, on the other hand, there is provided a configuration wherein a logical-address/physical-address transformation table is stored in the memory card 70 as will be described hereafter.

FIG. 11 is an explanatory diagram conceptually showing construction of a logical-address/physical-address transformation table stored in the memory card 70. As shown in the figure, a logical-address/physical-address transformation table is constructed so as to typically include sequentially increasing logical addresses each assigned to a 2-byte physical address. It should be noted that, as described earlier, every physical address and every logical address each occupy 2 bytes. A flash memory having a maximum capacity of 128 MB consists of 8,192 blocks. An address having a width of 3 bytes has a sufficient number of bits to be used for specifying all the flash memory 8192 blocks of such a flash memory. For this reason, the physical and logical addresses shown in FIG. 11 are each expressed by 2 bytes.

It should be noted, however, that the 2-byte address is expressed in the hexadecimal format consisting of a notation 0x followed by hexadecimal digits. That is to say, the notation 0x indicates that the following digits are each a hexadecimal digit. It is also worth noting that the hexadecimal format consisting of the notation 0x followed by hexadecimal digits is used in the following description to represent a hexadecimal number in the same way. In some figures, however, the notation 0x is omitted from the expression to make the hexadecimal expression simple.

FIGS. 12A and 12B are explanatory diagrams showing a typical structure of the logical-address/physical-address transformation table. The structure is based on the concept shown in FIG. 11. The logical-address/physical-address transformation table is stored in a certain block of the last segment of the flash memory 81 in a structure shown in FIGS. 12A and 12B.

First of all, as shown in FIG. 12A, 2 pages, namely, pages 0 and 1 of pages composing the table, are an area allocated to a logical-address/physical-address transformation table of segment 0. In the case of a flash memory having a storage capacity of 4 MB, for example, there is only 1 segment in the memory as is obvious from FIG. 13. In this case, pages 0 and 1 are an area allocated to a logical-address/physical-address transformation table of this segment.

In the case of a flash memory having a storage capacity of 8 MB, on the other hand, there are 2 segments in the memory. In this case, pages 0 and 1 are an area allocated to a logical-address/physical-address transformation table of segment 0 whereas the following 2 segments, namely, pages 2 and 3, are an area allocated to a logical-address/physical-address transformation table of segment 1.

With the storage capacity of the flash memory 81 increasing, the remaining pages in the block are an area allocated to logical-address/physical-address transformation tables of the remaining segments of the flash memory 81 in 2-page units. In the case of a flash memory having a maximum capacity of 128 MB, there are 16 segments in the memory, pages up to segment 15 at the maximum are therefore allocated as an area of logical-address/physical-address transformation tables. In this case, 32 pages of the block are an area allocated to logical-address/physical-address transformation tables of segments 0 to segment 15 in 2-page units. As shown in FIG. 12A, pages 0 to N, where N=31, are all used.

As is obvious from the above description, a logical-address/physical-address transformation table is created for each segment.

FIG. 12B is a diagram showing the structure of a logical-address/physical-address transformation table created for a segment. As described above, the logical-address/physical-address transformation table occupies a 2-page data area. Since a 1-page data area comprises 512 bytes as shown in FIG. 8E, the logical-address/physical-address transformation table shown in FIG. 12B occupies 1,024(=512×2) bytes.

As shown in FIG. 12B, the 2-page data area consisting of 1,024 bytes is divided into 2-byte units which are prescribed to be sequentially allocated to logical address 0, logical address 1 and so on, with the first 2-byte unit allocated to logical address 0. Bytes 991 and 992 constituting a 2-byte unit are prescribed to be allocated to logical address 495. A physical address to which a logical address is assigned is stored in a 2-byte unit allocated to the logical address. Thus, in the logical-address/physical-address transformation table provided by the present invention, in order to change the association of a logical address with a physical address in typically processing of swapping the logical address between blocks to accompany an operation to update data, the 2-byte unit allocated to the logical address is not changed but, instead, the contents of 2-byte unit are updated with a new physical address to which the logical address is newly assigned.

The remaining 32 bytes, namely, byte 993 to the last byte 1,024, are an area allocated to physical addresses of 16 redundant blocks. In this way, the physical addresses of the 16 redundant blocks can be managed. A redundant block is used typically as a work block as follows. In an operation to swap data between 2 blocks, the data of the first block is saved temporarily in the work block. Then, the data of the second block is transferred to the first block. Finally, the data saved in the work block is transferred to the second block.

By the way, while 1 segment consists of 512 blocks as described earlier, the number of manageable blocks is only 496 as is obvious from logical address 0 to logical address 495 shown in FIGS. 12A and 12B. This is because the remaining logical addresses are assigned to redundant blocks and, in the case of a flash memory, a certain number of blocks may be regarded as defective blocks (or unusable blocks or redundant blocks) as described earlier. In actuality, there is indeed a considerable number of defective blocks.

Thus, only 496 blocks can be managed as valid blocks or blocks which data can be written into and deleted from. These 496 blocks are considered to be sufficient.

Bit 3 of a management flag in a redundant portion of each page in a block for storing the logical-address/physical-address transformation table is set at 0. The management flag is shown in FIG. 9. A value of 0 set in this bit 3 of the management flag indicates that the block is used for storing the logical-address/physical-address transformation table.

The logical-address/physical-address transformation table is stored in a block. When the contents of the logical-address/physical-address transformation table, that is, the contents of the block, are updated, the swap processing explained earlier by referring to FIGS. 10A and 10B is carried out without exception much like other blocks for storing general data. It is thus out of the bounds of possibility that the block for storing the logical-address/physical-address transformation table becomes indeterminate, and it is impossible to store the logical-address/physical-address transformation table in a block located at a specific physical address.

When an access is made to the flash memory 81, the FAT system searches the blocks for one used for storing the logical-address/physical-address transformation table, that is, for one including a management flag with bit 3 set at 0 in each page. In order to make it easy for the FAT system to search the blocks for the logical-address/physical-address transformation table, this embodiment is prescribed so that the logical-address/physical-address transformation table is always stored in a block pertaining to the last segment of the flash memory 81. Thus, the FAT file system needs only to search the last segment of the flash memory 81 for a block used for storing the logical-address/physical-address transformation table. That is to say, in order to find the logical-address/physical-address transformation table, it is not necessary to search all segments of the flash memory 81.

The logical-address/physical-address transformation table shown in FIGS. 12A and 12B is stored in the memory card 70 typically when the memory card 70 is manufactured.

A relation between the capacity of a flash memory and the size of the logical-address/physical-address transformation table is explained by referring to FIG. 13.

As explained earlier by referring to FIGS. 12A and 12B, the size of a logical-address/physical-address transformation table for managing 1 segment is the same as 2 pages which occupy 1,024 bytes or 1 KB. Thus, in the case of a flash memory having a storage capacity of 4 MB or consisting of 1 segment, the size of the logical-address/physical-address transformation table is 1 KB as indicated on the rightmost column of the table shown in FIG. 13. In the case of a flash memory having a storage capacity of 8 MB or consisting of 2 segments, the size of the logical-address/physical-address transformation table is 2 KB, being equal to the size of 4 pages.

In the case of a flash memory having a storage capacity of 16 MB or consisting of 2,048 blocks or 4 segments, the size of the logical-address/physical-address transformation table is 4 KB, being equal to the size of 8 pages. In the case of a flash memory having a storage capacity of 16 MB or consisting of 1,024 blocks or 2 segments, the size of the logical-address/physical-address transformation table is 2 KB, being equal to the size of 4 pages.

In the case of a flash memory having a storage capacity of 32 MB or consisting of 4 segments, the size of the logical-address/physical-address transformation table is 4 KB, being equal to the size of 8 pages. In the case of a flash memory having a storage capacity of 64 MB or consisting of 8 segments, the size of the logical-address/physical-address transformation table is 8 KB, being equal to the size of 16 pages. In the case of a flash memory having a storage capacity of 128 MB or consisting of 16 segments, the size of the logical-address/physical-address transformation table is 16 KB, being equal to the size of 32 pages.

4-7: Directory Structure

Figure 14:
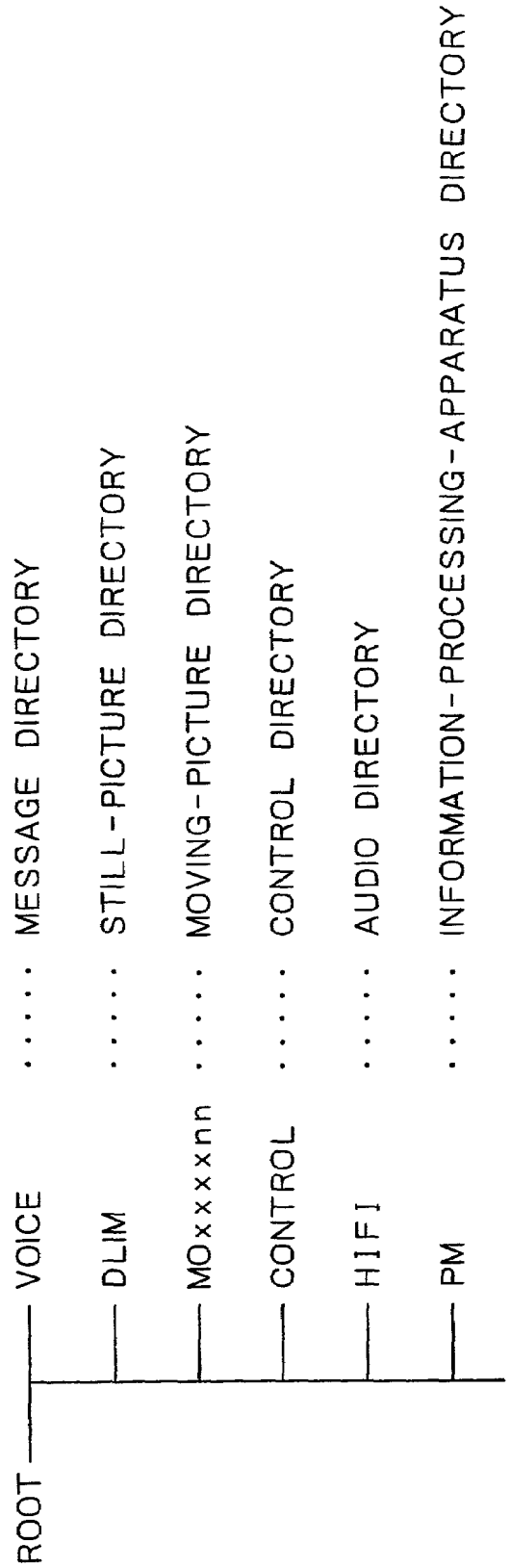
FIG. 14 is an explanatory diagram showing a typical structure of directories stored in the memory card provided by the embodiment.

FIG. 14 is an explanatory diagram showing a typical structure of directories stored in the memory card 70. Various kinds of main data that can be handled by the memory card 70 include computer data, moving-picture data, still-picture data, message data, audio data and control data. Thus, under a root directory in the directory structure, there are provided a message directory named VOICE, a still-picture directory named DCIM, a moving picture directory named MOxxxxnn, a control directory named CONTROL, an audio directory named HIFI and information-processing apparatus directory named PM.

Under each of the directories under the root directory, there are provided sub-directories and files each called a data base as described above to form the so-called tree structure. It should be noted that, of course, such a structure of directories is no more than a typical directory structure. In actuality, a structure of directories is created in accordance with a state of recording by the information-processing apparatus 1 and types of recorded files.

5: FAT Structure

As described in the explanation of the file-system hierarchy shown in FIG. 7, file management processing is carried out by using the FAT file system. To put in detail, in order for the information-processing apparatus 1 shown in FIG. 2 to implement operations to record and play back (or write and read out) data into and from the memory card 70, the FAT file system refers to a logical-address/physical-address transformation table in accordance with a request made in application processing and transforms a logical address into a physical address, making an actual access to the physical address in the memory card 70. In the following description, the structure of the FAT file system is explained.

Figure 15:
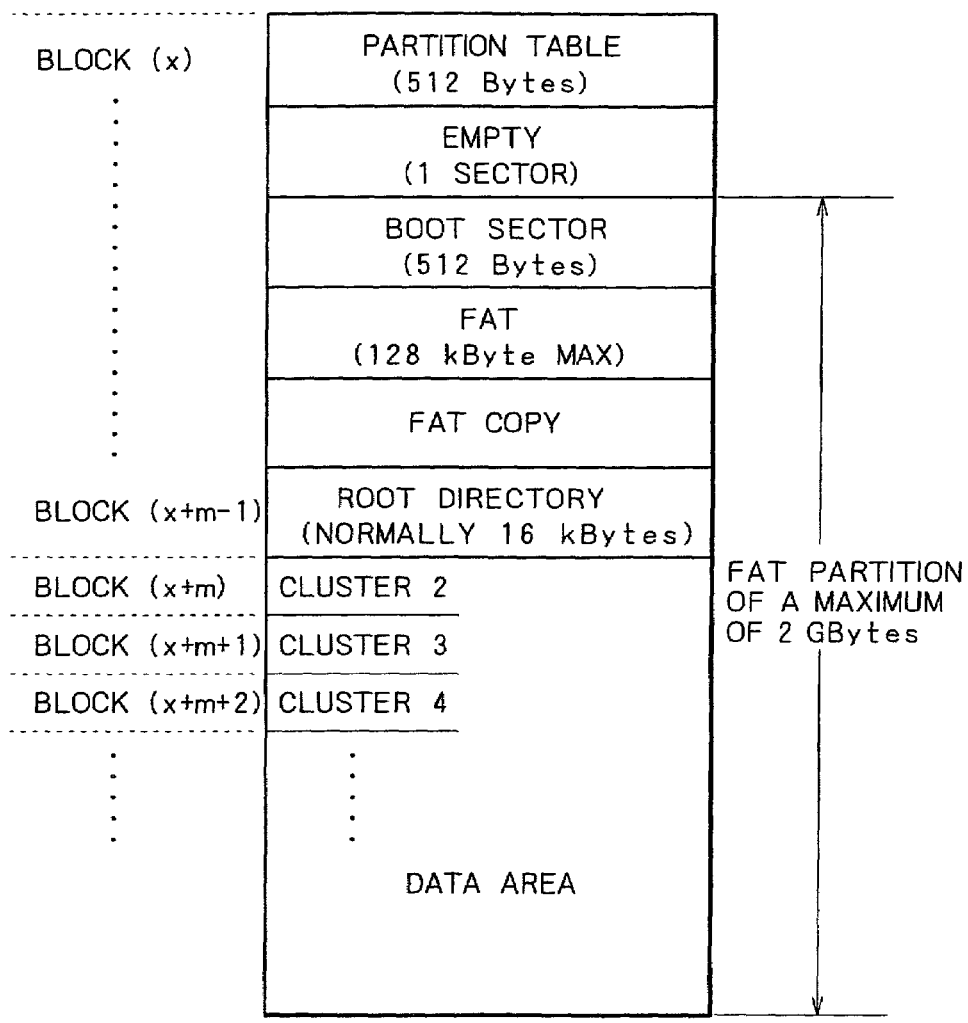
FIG. 15 is an explanatory diagram showing a management structure based on a FAT (File Allocation Table) file system.

FIG. 15 is an explanatory diagram showing the outline of the management structure based on the FAT file system. It should be noted that, while the FAT structure shown in FIG. 15 and the logical-address/physical-address transformation table are stored in the memory card 70, the FAT structure is a management structure stored in the memory card 70 in this embodiment.

As shown in the figure, the FAT structure comprises a partition table, an empty area, a boot sector, a FAT, a FAT copy, a root directory and a data area.

The data area includes cluster 2, cluster 3 and so on. A cluster is a data unit used by the FAT file system as a management unit. In general, in the FAT file system, the standard size of a cluster is set at 4 Kbyte. However, this cluster size can be changed to the number of power of 2 in the range of 512 bytes to 32 Kbytes.

In the memory card 70 provided by this embodiment, the size of a block is 8 Kbyte or 16 Kbyte as described above. In the case of a memory card with a block size of 8 Kbyte, the size of a cluster handled by the FAT file system is also 8 Kbyte. In the case of a memory card 70 with a block size of 16 Kbyte, on the other hand, the size of a cluster handled by the FAT file system is also 16 Kbyte. That is to say, the size of 8 Kbyte or 16 Kbyte is a data unit used in FAT management and a block size used as a data unit in the memory card 70. It should be noted that, from the memory-card point of view, the cluster size used in the FAT file system is equal to the size of each block in the memory card 70. For this reason, in the following description of this embodiment, a block is regarded to be equal in size as a cluster for the sake of simplicity.

On the left side of FIG. 15, block numbers x, - - - (x+m−1), (x+m), (x+m+1), (x+m+2) and so on are shown. Various kinds of data constituting the FAT structure are stored in the blocks to which the block numbers x, - - - (x+m−1), (x+m), (x+m+1), (x+m+2) and so on are assigned.

The partition table of the FAT structure includes the start and end addresses of the FAT partition with a size not exceeding 2 Gbyte. The FAT area is used for storing information on the FAT structure such as a FAT size, a cluster size and the size of each area for the so-called 12-bit and 16-bit FAT file systems.

The FAT area is a table showing a link structure of clusters composing each file as will be described later. The FAT area is followed by an area for recording a copy of data stored in the FAT area.

The root directory includes a file name, a first-cluster number and an attribute for each file. The file name, the first-cluster number and the attribute for each file are stored in area with a size of 32 bytes.

In the FAT area, clusters are allocated to FAT entries on a 1-to-1 basis. Each entry in a specific cluster includes a link destination describing the number assigned to a cluster following the specific cluster. Assume that a file is stored in a plurality of clusters or blocks. In this case, the directory shows the number assigned to the first cluster. An entry of the first cluster in the FAT area shows a number assigned to the second cluster and an entry of the second cluster in the FAT area shows a number assigned to the third cluster and so on. In this way, links of clusters are stored in the FAT area.

Figure 16:
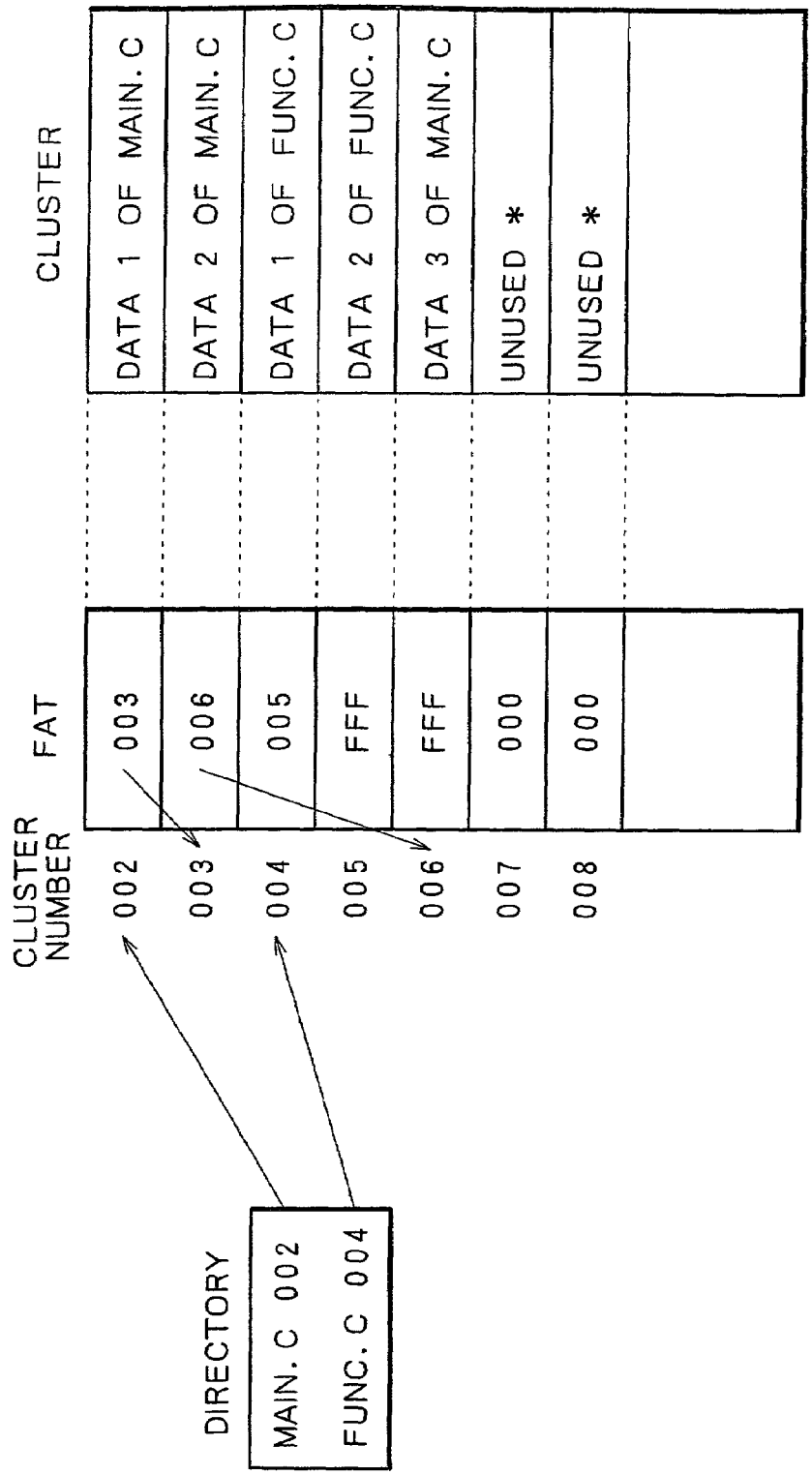
FIG. 16 is an explanatory diagram showing a model of a link management structure based on the FAT file system.

FIG. 16 is an explanatory diagram showing a model of the concept of links described above. Numbers shown in the figure are expressed in the hexadecimal format. Assume that there are 2 files, namely, MAIN.C and FUNC.C. In this case, the directory shows the first clusters of the 2 files. Assume that numbers assigned to the 2 first clusters of the files MAIN.C and FUNC.C are 002 and 004 respectively.

For the file MAIN.C, the entry for the first-cluster number of 002 shows a number of 003 assigned to the second cluster. The entry for the second-cluster number of 003 shows a number of 006 assigned to the next cluster. The entry for the cluster number of 006 shows a number of FFF indicating that the cluster is the last cluster of the file MAIN.C.

In this way, the file MAIN.C is recorded in the memory card 70 in a first cluster indicated by the number of 002, then a second cluster indicated by the number of 003 and then a last cluster indicated by the number of 006. Assume that the cluster numbers match block numbers in the memory card 70. In this case, the file MAIN.C is stored in the memory card 70 in a first block indicated by the number of 002, then a second block indicated by the number of 003 and then a last block indicated by the number of 006. It should be noted, however, that clusters are handled in the FAT file system by using logical addresses as described above. Thus, the logical addresses of clusters cannot be used as physical addresses of blocks as they are.

By the same token, the file FUNC.C is recorded by the FAT file system in the memory card 70 in a first cluster indicated by the number of 004 and then a last cluster indicated by the number of 005.

It should be noted that a cluster number of 000 shown in an entry of the FAT area indicates that the cluster associate with the entry corresponds to an unused block.

By the way, in addition to first-cluster numbers shown in FIG. 16, a file's directory stored in the root directory area also includes typically various kinds of data shown in FIG. 17 for the file.

As shown in FIG. 17, for each file, the directory includes the name of the file, an extension, an attribute, a change time, a change date and the size of the file in addition to a number assigned to the first cluster. Each number enclosed in parentheses for a piece of data is the number of bytes used for storing the piece of data.

A sub-directory cataloged as a subordinate to a directory is stored in the data area instead of being stored in the root directory shown in FIG. 15. That is to say, each sub-directory is treated like a file having a directory structure. The size of a sub-directory is infinite. In addition, an entry to the sub-directory itself and an entry to the parent directory of the sub-directory are required.

Figure 18:
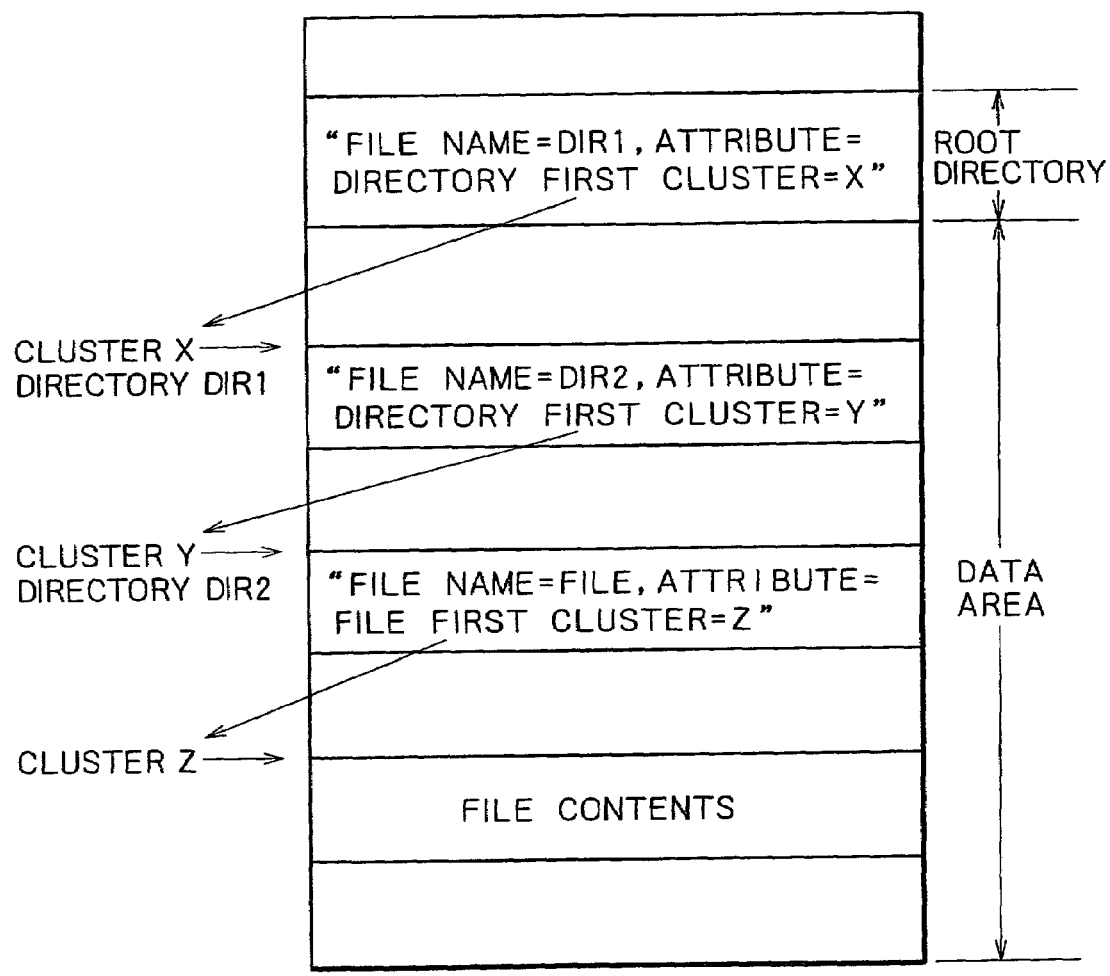
FIG. 18 is an explanatory diagram showing a typical structure of sub-directories and files in a root directory.

FIG. 18 is an explanatory diagram showing a typical structure of the root directory including a file named DIR1, another file named DIR2 and a further file named FILE. The file DIR1 has an attribute of directory and is a sub-directory subordinate to the root directory. Likewise, the file DIR2 has an attribute of directory and is a sub-directory subordinate to the sub-directory DIR1. The file named FILE is included in the sub-directory DIR2.

Thus, the root directory includes a number assigned to the first cluster of the file DIR1 which is a sub-directory. In the FAT area, a cluster X is linked to a cluster Y which is linked to a cluster Z.

As is obvious from the figure, the sub-directories DIR1 and DIR2 are each treated like a file and each include a FAT link.

6: Interface between the Memory Card and the Information-processing Apparatus

Figure 19:
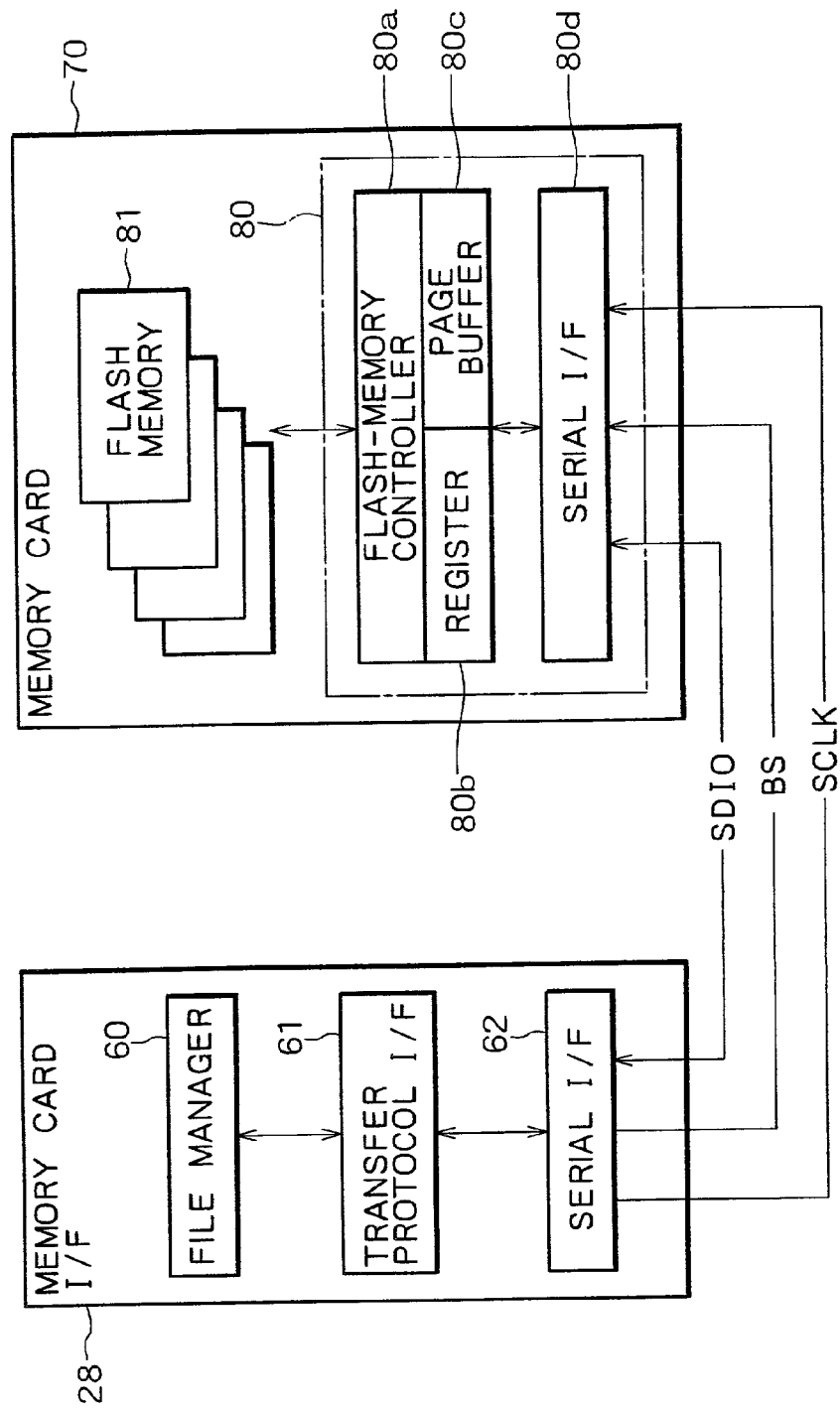
FIG. 19 is an explanatory diagram showing the configuration of a serial interface system between the memory card and the information-processing apparatus implemented by the embodiment.

FIG. 19 is an explanatory diagram showing the configuration of a serial interface system between the memory card 70 and the memory-card interface 28 employed in the information-processing apparatus 1. As shown in FIG. 19, the control IC 80 employed in the memory card 70 comprises blocks including a flash-memory controller 80a, a register 80b, a page buffer 80c and a serial-interface 80d.

The flash memory 81 controller 80a transfers data between the flash memory 81 and the page buffer 80c on the basis of a parameter set in the register 80b. Data stored temporarily in the page buffer 80c is transferred to the memory-card interface 28 employed in the information-processing apparatus 1 by way of the serial interface 80d. On the other hand, data received from the memory-card interface 28 employed in the information-processing apparatus 1 is buffered by the page buffer 80c through the serial interface 80d.

The memory-card interface 28 has a structure for interfacing with the memory card 70. The structure includes a file manager 60, a transfer protocol interface 61 and a serial interface 62.

The file manager 60 manages files stored in the memory card 70. In the system implemented by this embodiment, for example, the memory card 70 includes a stored management file for managing main-data files stored in the memory card 70. The CPU 22 retrieves the management file from the memory card 70 mounted on the information-processing apparatus 1 and uses the file for creating the file manager 60. An access to the memory card 70 is made through the file manager 60.

The transfer protocol interface 61 makes accesses to the register 80b and the page buffer 80c.

The serial interface 62 prescribes protocols for transferring any arbitrary data through 3 signal lines connecting the memory-card interface 28 to the memory card 70. The 3 signal lines are a SCLK (serial clock) line, a BS (bus state) line and an SDIO (serial data input/output) line.

In operations carried out in the configuration described above, the information-processing apparatus 1 makes read and write accesses to the flash memory 81 employed in the memory card 70.

7: Processing at Mounting of the Memory Card

In the information-processing apparatus 1 described above, the user needs to obtain required application software and install the software in the information-processing apparatus 1 as is the case with the ordinary personal computer in order to have the information-processing apparatus 1 carry out desired information-processing operations.

In particular, in a hot plug-in operation described earlier, when a memory card 70 containing an application program and a data file is mounted on the information-processing apparatus 1, the CPU 22 automatically installs the application program and the data file recorded in the memory card 70 into the D-RAM 24, activating the application program. It is needless to say that an application program already installed in the D-RAM 24 can be activated at an activation request made by the user by carrying out an operation. Hereinafter, installing and activating of an application program will be described.

First of all, a characteristic operation of this embodiment is described in a simple and plain manner as follows. When the user activates an application program or switches the software from an application program to another, the OS functioning as basic software in the CPU 22 invokes the application program and increments the contents of a counter for the newly activated application program. The counter is included in an activation-history table provided for all application programs. The activation-history table is stored in a non-volatile area of the D-RAM 24. It should be noted that the activation-history table needs to be preserved in the D-RAM 24 even if the power supply of the information-processing apparatus 1 is turned off. That is why the activation-history table is stored in a non-volatile area of the D-RAM 24.

The activation-history table has a typical configuration like one shown in FIG. 26. As is obvious from the figure, the number of application programs, that is, the number of table entries, is determined by the size of the activation-history table. Provided for each application program, a table entry includes an application-program ID, an application name, an activation count, a save flag, a temporary attribute and an address.

The activation count represents the number of times the application program has been activated. The save flag indicates whether or not the application program has been saved in the memory card 70 in processing described later. The temporary attribute is a flag indicating whether or not the application program is a program temporarily installed in the memory card 70. The address indicates a location in the D-RAM 24 at which the application program is stored.

The activation count is the counter's contents which are incremented when the application program is activated as described above.

When a memory card 70 is plugged into a memory slot 7, the information-processing apparatus 1 detects the plugging automatically and retrieves a driver program, an application program or data from the memory card 70, expanding the program or the data in the D-RAM 24. The driver program, the application program and the data are stored in the memory card 70 in advance.

If the size of a remaining storage area in the D-RAM 24 is smaller than the size of a program or the amount of data to be loaded from the memory card 70, however, the program or the data cannot be newly installed unless an empty area is newly allocated in the D-RAM 24.

In order to solve this problem in this embodiment, the OS saves application programs and/or data files already loaded in the D-RAM 24 to an empty area in the memory card 70. The application programs and the data files to be saved are selected by referring to the activation-history table. The OS saves selected application programs and the data files thereof sequentially one program after another, starting with that used least frequently by the user until a free storage area large enough for accommodating a program or data to be newly loaded from the memory card 70 is allocated in the D-RAM 24.

It should be noted that the memory card 70 is assumed to have an empty area having a size at least equal to the total size of an application program and data to be installed in the D-RAM 24.

After application programs and the data files thereof stored in the D-RAM 24 are saved into the memory card 70 in the order of increasing frequencies described above, a free storage area allowing an application program and/or data to be newly installed is allocated in the D-RAM 24. Then, the OS expands the application program and/or data stored in advance in the memory card 70 into the D-RAM 24. The OS also adds an application-program ID, an application name, an activation count, a save flag, a temporary attribute and an address as an entry for the installed application program to the activation-history table. The OS sets the activation count as well as the temporary attribute at 1 and then activates the application program.

When the memory card 70 is taken out from the information-processing apparatus 1, that is, when the user carries out an operation to eject the memory card 70, the application program installed from the memory card 70 as described above is uninstalled and application programs data files thereof saved from the D-RAM 24 to the memory card 70 as explained above are restored to the D-RAM 24. In this case, the OS actually uninstalls application programs each identified by a temporary attribute of 1 in the activation-history table. To be more specific, such application programs are restored to the memory card 70. As described above, a temporary attribute of 1 assigned to an application program indicates that the application program was a program loaded from the memory card 70.

The OS restores application programs and their data files to the D-RAM 24 by retrieving the programs and the data files thereof from the memory card 70 and reloading them into the D-RAM 24 in the same state of expansion as before. At that time, the save flag assigned to each of the restored application programs in the activation-history table is reset to 0.

Figure 27:
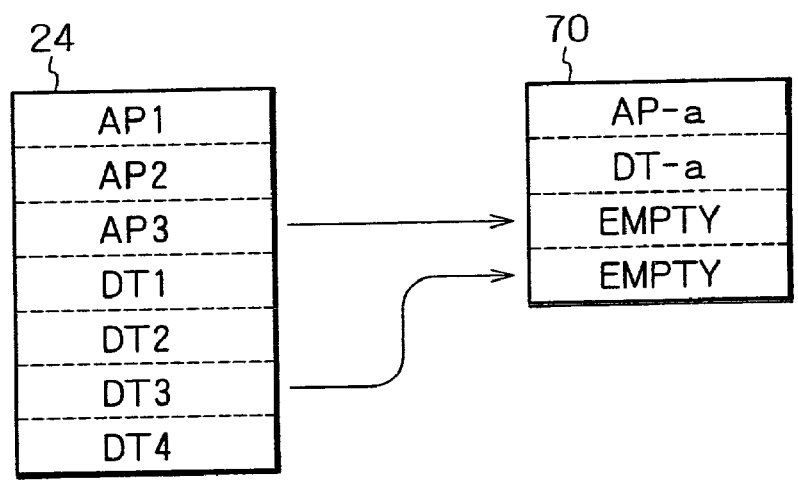
FIG. 27 is an explanatory diagram showing how an application program is installed and saved in this embodiment.
Figure 28:
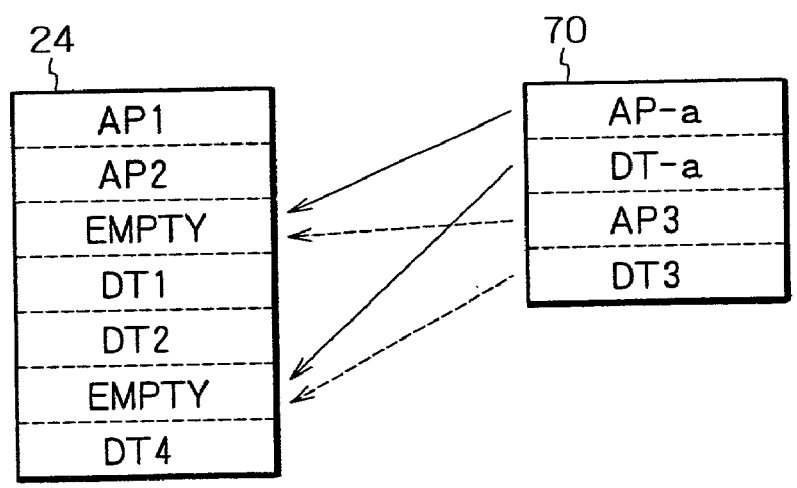
FIG. 28 is an explanatory diagram showing how an application program is installed and saved in this embodiment.
Figure 29:
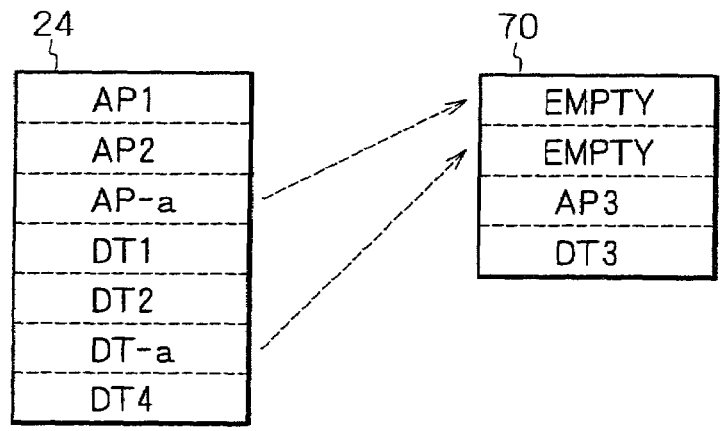
FIG. 29 is an explanatory diagram showing how an application program is installed and saved in this embodiment.

The above processing is further explained by referring to models shown in FIGS. 27, 28 and 29. First of all, assume that the D-RAM 24 is used all but fully for storing application programs AP1, AP2 and AP3 as well as data files DT1, DT2, DT3 and DT4 as shown in FIG. 27. At that time, let a memory card 70 used for recording an application program AP-a and a data file DT-a be inserted into a memory slot 7.

In this case, the hot plug-in function of the OS executed by the CPU 22 makes an attempt to install the application program AP-a as well as the data file DT-a from the memory card 70 and then activate the application program AP-a. In the D-RAM 24, however, there is no enough free storage area left.

In order to solve this problem, the OS selectively saves application programs sequentially one program after another, starting with that used least frequently by the user. Assume that the application program AP3 has been used least frequently by the user. In this case, the OS saves the application program AP3 and the data file DT3 thereof to an empty area in the memory card 70 as indicated by solid-line arrows in FIG. 27.

As a result, since empty areas are created in the D-RAM 24 as shown in FIG. 28, the application program AP-a and the data file DT-a thereof are installed into the empty areas in the D-RAM 24 as indicated by solid-line arrows in the figure. FIG. 29 is a diagram showing the states of the D-RAM 24 and the memory card 70, which are obtained after the application program AP-a and the data file DT-a thereof are installed into the empty areas.

After the application program AP-a and the data file DT-a thereof are installed from the memory card 70 into the empty areas of the D-RAM 24, the CPU 22 activates the application program AP-a.

When the memory card 70 is ejected from the information-processing apparatus 1, on the other hand, the application program AP-a and the data file DT-a thereof are first of all uninstalled, that is, restored from the D-RAM 24 to the memory card 70 as shown by dashed-line arrows in FIG. 29. As a result, since empty areas are created in the D-RAM 24 as shown in FIG. 28, the application program AP3 and the data file DT3 thereof are restored to the free storage areas in the D-RAM 24 as indicated by dashed-line arrows in the figure. The states of the D-RAM 24 and the memory card 70, which are shown in FIG. 27, are obtained after the application program AP-a and the data file DT-a thereof are restored to the memory card 70 and the application program AP3 and the data file DT3 thereof are restored to the D-RAM 24. After these states are established, the memory card 70 is ejected.

Figure 30:
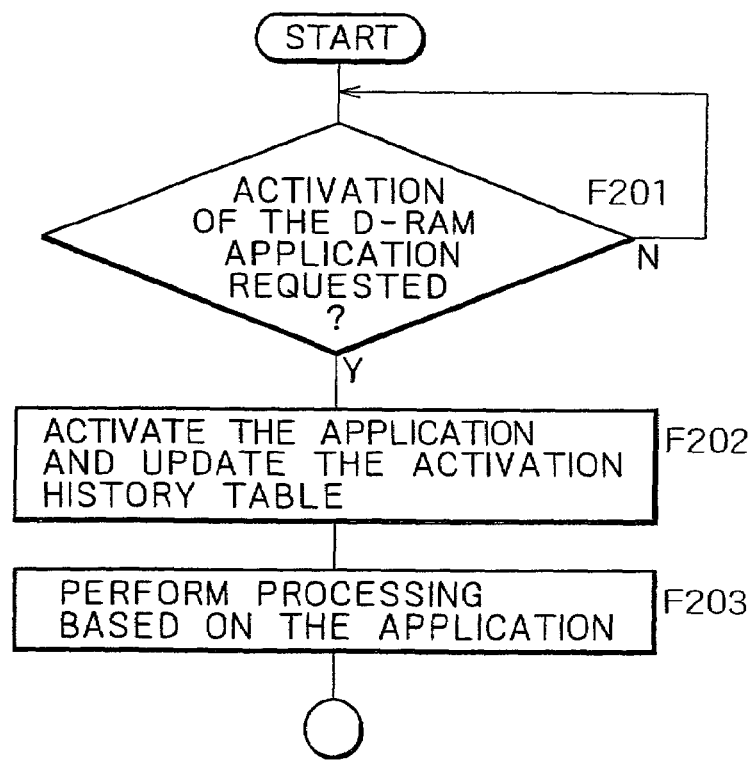
FIG. 30 shows a flowchart representing processing carried out upon activation of an application program at a time other than mounting of the memory card in this embodiment.
Figure 31:
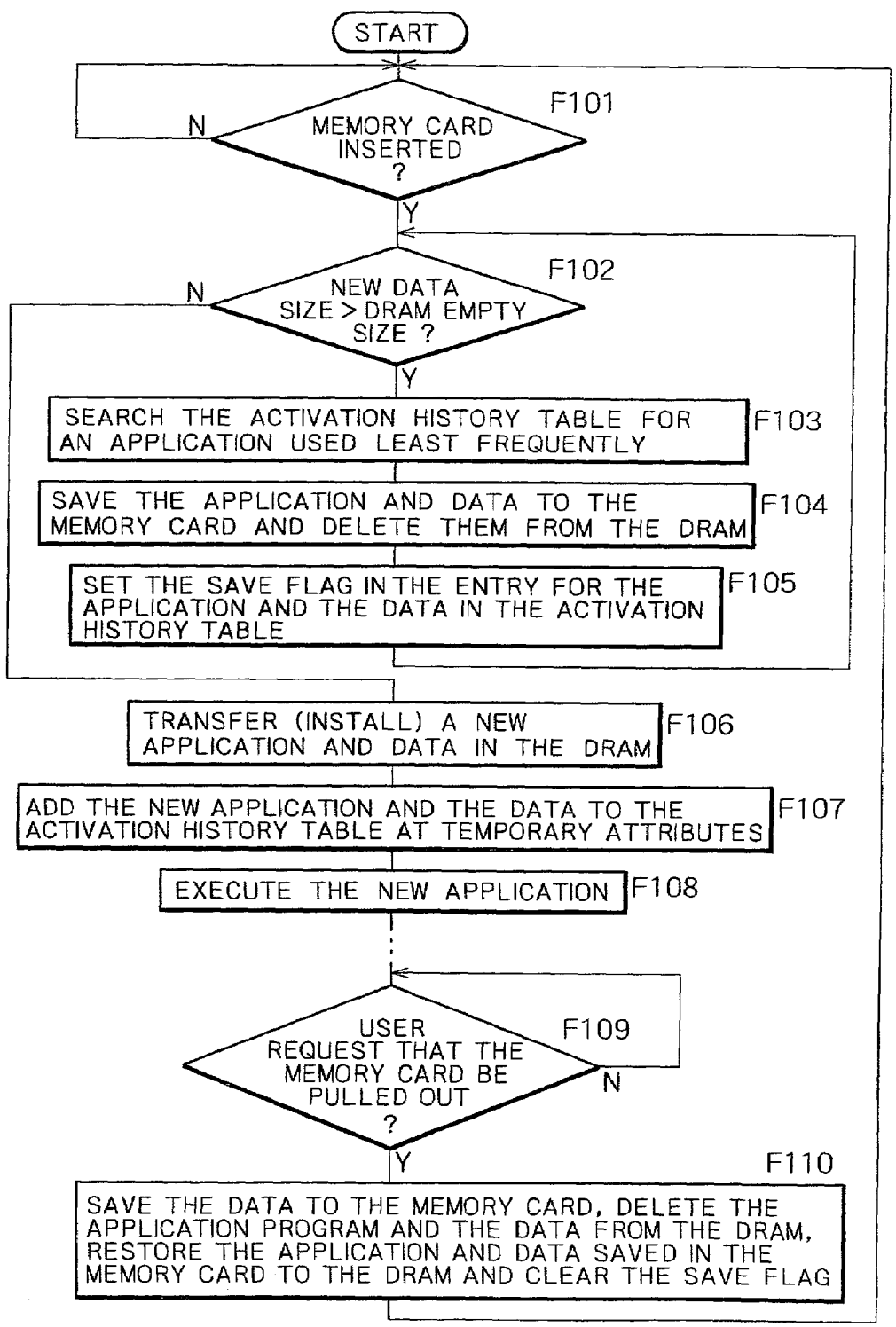
FIG. 31 shows a flowchart representing processing which is carried out upon activation of an application program when a memory card is mounted on the information-processing apparatus in this embodiment.

FIGS. 30 and 31 show flowcharts representing processing carried out by the CPU 22 to implement the operations described above To be more specific, FIG. 30 shows a flowchart representing processing carried out upon activation of an application program at a time other than mounting of the memory card 70. That is to say, the processing is carried out with no memory card 70 mounted or carried out at a time after an application program is installed from a mounted memory card 70 and activated. In other words, execution of processing is not started by the so-called hot plug-in function. In brief, the processing is processing to activate an ordinary application program.

As shown in FIG. 30, the flowchart begins with a step F201 to form a judgment as to whether or not a command to activate a certain application program stored in the D-RAM 24 has been issued typically by an operation carried out by the user. If such a command has been issued, the flow of the processing goes on to a step F202 at which the CPU 22 activates the application program and updates the activation-history table. To put it in detail, the CPU 22 increments the activation-history table's activation count assigned to the application program.

At the next step F203, the CPU 22 executes the application program to carry out processing based on the program.

As described above, the activation-history table is updated at activation of an application program. In this way, the CPU 22 is capable of always knowing an activation history of each application program stored in the D-RAM 24.

On the other hand, FIG. 31 shows a flowchart representing processing which is started by the so-called hot plug-in function at a time the memory card 70 is inserted into the memory slot 7. As shown in FIG. 31, the flowchart begins with a step F101 to form a judgment as to whether or not insertion of the memory card 70 into the memory slot 7 has been detected. If insertion of the memory card 70 into the memory slot 7 has been detected, the flow of the processing goes on to a step F102 at which the CPU 22 finds the total size of an application program and a data file DT relevant thereto to be loaded from the memory card 70 as well as finds the total size of free storage areas in the D-RAM 24. The CPU 22 compares the total sizes with each other.

If the total size of an application program and a data file DT relevant thereto to be loaded from the memory card 70 is found not greater than the total size of free storage areas in the D-RAM 24, the flow of the processing goes on to a step F106 at which the application program and the data file DT relevant thereto are loaded into the D-RAM 24 from the memory card 70.

At the next step F107, the activation-history table is updated for the newly installed application program. To be more specific, a new entry for the newly installed application program is created in the activation-history table and the activation count as well as the temporary attribute of the new entry are each set at 1.

At the next step F108, the CPU 22 executes the application program to carry out processing based on the program.

If the result of the comparison at the step F102 indicates that the total size of an application program and a data file DT relevant thereto to be loaded from the memory card 70 is greater than the total size of free storage areas in the D-RAM 24, on the other hand, the flow of the processing goes on to a step F103 at which the CPU 22 searches the activation-history table for an application program with a smallest activation count.

At the next step F104, the application program with a smallest activation count is saved to the memory card 70 and deleted from the D-RAM 24 to create a free storage area.

At the next step F105, the save flag for the saved application program in the activation-history table is set.

The flow of the processing then goes back to the step F102 at which the CPU 22 finds a new total size of free storage areas in the D-RAM 24 and compares the new total sizes with the total size of an application program and a relevant data file DT, which are stored in the memory card 70.

If the total size of an application program and a data file DT relevant thereto is found not greater than the total size of free storage areas in the D-RAM 24, the flow of the processing goes on to the step F106 to repeat the same pieces of processing of the step F106 and the subsequent steps. If the total size of an application program and a data file DT relevant thereto is found greater than the total size of free storage areas in the D-RAM 24, on the other hand, the flow of the processing goes on to the step F103 at which pieces of processing of the step F103 and the subsequent steps are carried out again. That is to say, the CPU 22 searches the activation-history table for an application program with a smallest activation count, saves the application program from the D-RAM 24 to the memory card 70 and updates the activation-history table before going back to the step F102.

It should be noted that, at the step F103, the activation-history table is searched for an application program without a save flag.

As described above, if a free storage area with a sufficient size is not available in the D-RAM 24, the pieces of processing at the steps F102 to F105 are carried out repeatedly to sequentially save application programs and data files DT relevant thereto in an order of increasing application counts, starting with an application program with a smallest application count till a free storage area with a sufficient size is allocated in the D-RAM 24.

As a free storage area with a sufficient size is secured in the D-RAM 24, the flow of the processing goes on to a step F106 and the subsequent steps at which an application program and a data file DT relevant thereto are loaded into the D-RAM 24 from the memory card 70, the activation-history table is updated for the newly installed application program and the application program is executed to carry out processing based on the program.

As described above, when the memory card 70 is mounted, an application program stored in the memory card 70 is automatically installed in the D-RAM 24 and executed. At that time, it is neither necessary for the user to worry about the availability of a free storage area in the D-RAM 24 nor necessary to carry out an operation to delete an application program from the D-RAM 24 or save an application program from the D-RAM 24 to the memory card 70.

The above description does not include an explanation of processing that can be carried out by the user as long as the memory card 70 is mounted on the information-processing apparatus 1 and as long as an application program loaded from the memory card 70 remains installed in the D-RAM 24. Examples of the processing include an operation carried out by the user to halt the execution of the application program and an operation to re-invoke a temporarily suspended application program.

The flow of the processing then goes on to a step F109 to form a judgment as to whether or not the user has carried out an operation to eject the memory card 70. If the user carried out an operation to eject the memory card 70, the flow of the processing goes on to a step F110.

At the step F110, the CPU 22 uninstalls application programs and their data files for which the temporary attributes are set. Application programs and their data files for which the temporary attributes are set are application programs and data files loaded from the memory card 70. Uninstallation of an application program and a data file thereof means restoration of the application program and the data file thereof to the memory card 70 and their deletion from the D-RAM 24. The uninstallation results in a free storage area in the D-RAM 24. Thus, the CPU 22 is capable of restoring application programs and their data files for which the save flags are set to the D-RAM 24. Application programs and their data files for which the save flags are set are application programs and data files saved to the memory card 70.

As the application programs and their data files are restored to the D-RAM 24, the save flags are reset. As a result, the D-RAM 24 is restored to a state which existed before the memory card 70 was mounted on the information-processing apparatus 1.

By virtue of the processing carried out as described above, the user is capable of using an application program without worrying about memory resources offered by the D-RAM 24. As a result, there is exhibited an effect of implementation of extremely comfortable operations developing no stress.

In addition, when a memory card 70 is mounted, an application program is installed and, when the memory card 70 is dismounted, the application program is uninstalled so that the D-RAM 24 is returned to a state prior to the mounting of the memory card 70. As a result, the user is allowed to carry out intuitive operations and enjoy noticeably improved operatability. In addition, since the user is capable of using an application program stored in the memory card 70 without being aware of the capacity and the status of the D-RAM 24 at all, the user is given noticeably enhanced convenience.

Furthermore, since the activation-history table is updated and managed properly each time an application program is activated, it is possible to select an application program with a smallest activation count as a program to be moved and saved. Thus, it is possible to save an application program least likely activated with the memory card 70 mounted on the information-processing apparatus 1. Thus, a condition favorable to the user can be implemented.

Moreover, the hot plug-in function automatically activates an application program when the application program is installed from the memory card 70 to the D-RAM 24. As a result, implementation of intuitive operations to be carried out by the user as well as easily comprehensible operations can be further promoted.

8: Activation of an Application Program and Reference to Data

The following description explains characteristic operations of the information-processing apparatus 1 implemented by this embodiment, which include activation of an application program and reference to data.

As described earlier, the information-processing apparatus 1 includes the D-RAM 24 and the ROM 23. The D-RAM 24 and the ROM 23 serve as an internal storage unit for storing application programs and data files. In addition, the memory card 70 is an external storage unit accessible to the information-processing apparatus 1.

It should be noted that the communication unit 36 allows accesses to be made to external servers and home pages through a communication network. Thus, these external servers can each be regarded as an external storage unit accessible to the information-processing apparatus 1. The external servers and others will be explained later by referring to FIG. 24.

The user is capable of giving a command to the information-processing apparatus 1 to activate any application software in order to carry out processing based on the application software. It is needless to say that the user is allowed to verify and modify a variety of data files referred to by application software in the course of its operation.

Application software and data files can be stored in an internal storage unit such as the D-RAM 24 or an external storage unit such as the memory card 70.

The information-processing apparatus 1 is not capable of executing application software stored in the external storage unit and making an access to a data file stored in the external storage unit unless the software and the file are loaded into the internal storage unit first. That is to say, in order to use application software or a data file stored in the external storage unit of a conventional system such as the conventional information-processing apparatus, the user must load the software and the file into the internal storage unit.

In the case of this embodiment, on the other hand, the user needs only to carry out an operation to invoke desired application software or to select a data file to be referred without being aware of whether the software and the file are stored in the external or internal storage file. For the reason described above, the embodiment need to carry out operations shown in FIG. 20 in a simple and plain manner.

Figure 20:
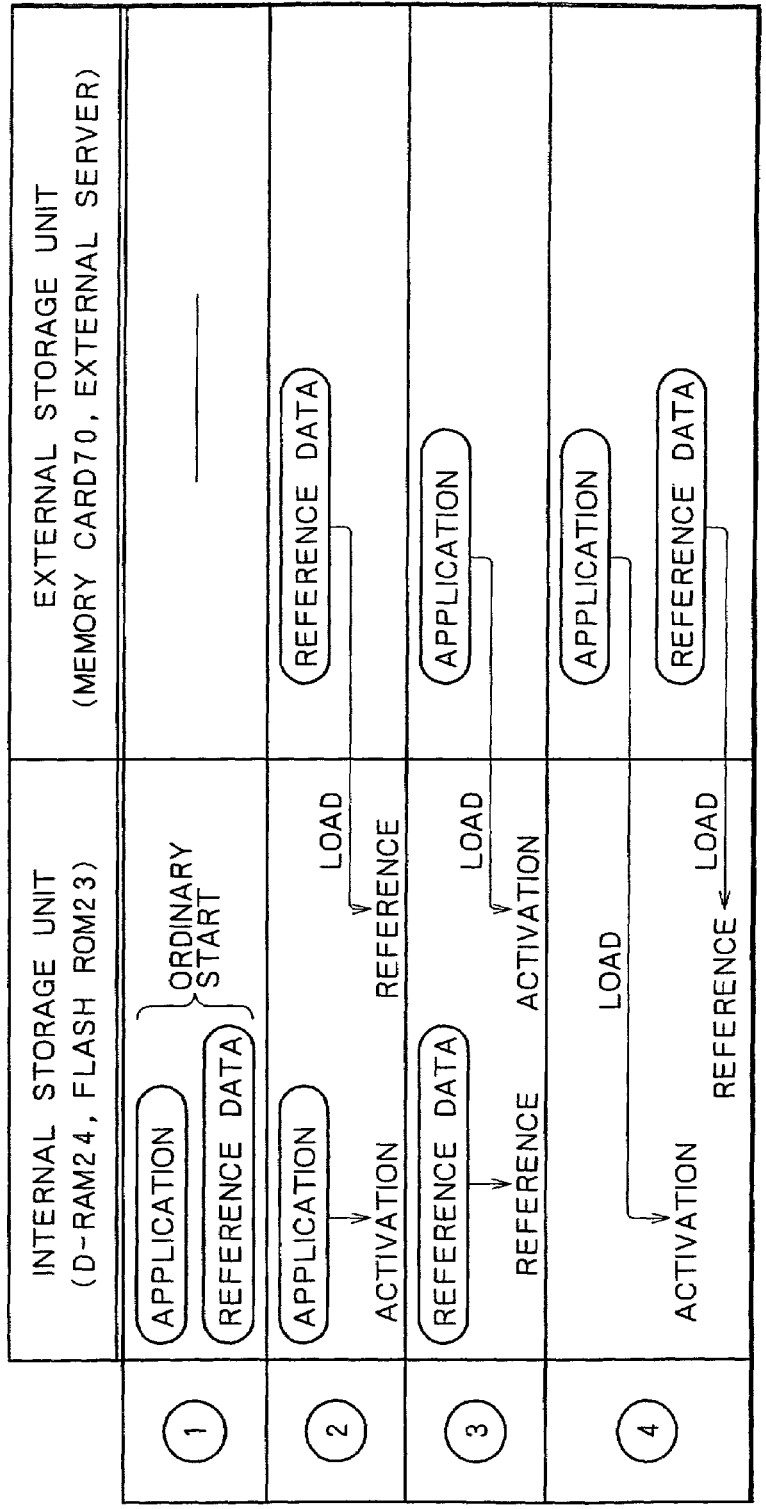
FIG. 20 is an explanatory diagram showing a pattern of storage locations of activated application software and data files to be referenced during an operation of the application software in the embodiment.

FIG. 20 is an explanatory diagram showing a pattern of storage locations of activated application software and data files to be referenced during execution of the application software.

Row 1j shows a case in which application software to be activated and a data file to be referenced are both stored in the internal storage unit.

In this case, the CPU 22 carries out processing to normally activate the application software stored in the D-RAM 24. In order to reference the data file during execution of the application software, the CPU 22 retrieves the data file from the D-RAM 24 and supplies the data file to processing based on execution of the application software.

Row 2j shows a case in which application software to be activated is stored in the internal storage unit but a data file to be referenced is stored in the external storage unit.

In this case, the CPU 22 carries out processing to normally activate the application software stored in the D-RAM 24. In order to reference the data file during execution of the application software, the CPU 22 first loads the data file from the memory card 70 into the D-RAM 24, then retrieves the data file from the D-RAM 24 and, finally, supplies the data file to processing based on execution of the application software.

Row 3j shows a case in which application software to be activated is stored in the external storage unit but a data file to be referenced is stored in the internal storage unit.

In this case, in order to activate the application software, the CPU 22 first loads the software from the memory card 70 into the D-RAM 24, and then carries out processing to activate the software loaded in the D-RAM 24. In order to reference the data file during execution of the application software, the CPU 22 retrieves the data file from the D-RAM 24 and supplies the data file to processing based on execution of the application software.

Row 4j shows a case in which application software to be activated and a data file to be referenced are both stored in the external storage unit.

In this case, in order to activate the application software, the CPU 22 first loads the software from the memory card 70 into the D-RAM 24, and then carries out processing to activate the software loaded in the D-RAM 24. In order to reference the data file during execution of the application software, the CPU 22 first loads the data file from the memory card 70 into the D-RAM 24, then retrieves the data file from the D-RAM 24 and, finally, supplies the data file to processing based on execution of the application software.

That is to say, in the case of this embodiment, if application software to be activated and/or a data file to be referenced are stored in the external storage unit, the software is automatically loaded into the internal storage unit to be executed and/or the data file is loaded into the internal storage unit to be referenced at the time they are needed. In other words, it is not necessary for the user to carry out an operation to transfer application software and/or a data file from the external storage unit such as the memory card 70 to the D-RAM 24 in advance.

Figure 21:
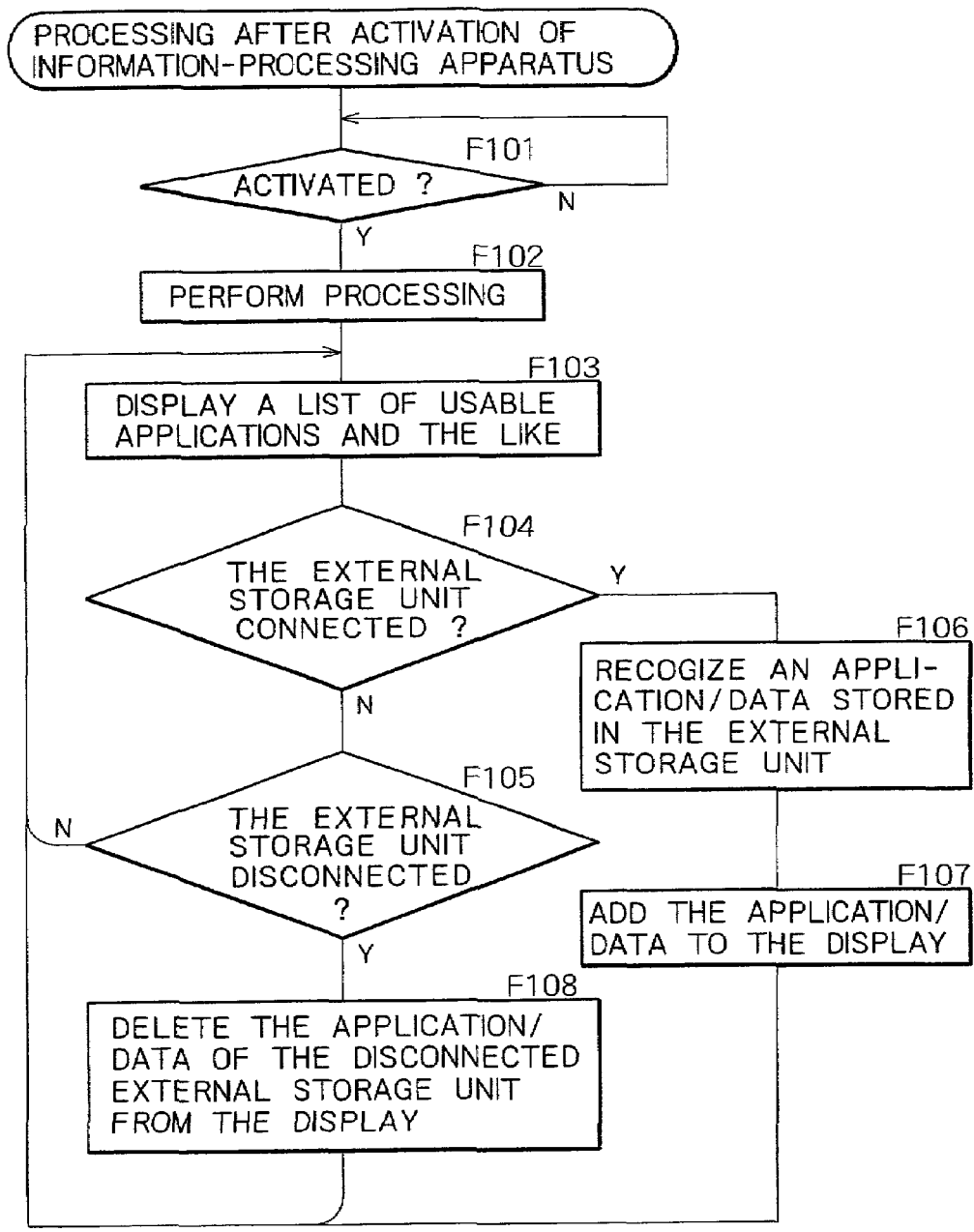
FIG. 21 is a flowchart representing processing which is carried out after the information-processing apparatus implemented by the embodiment is activated.
Figure 22:
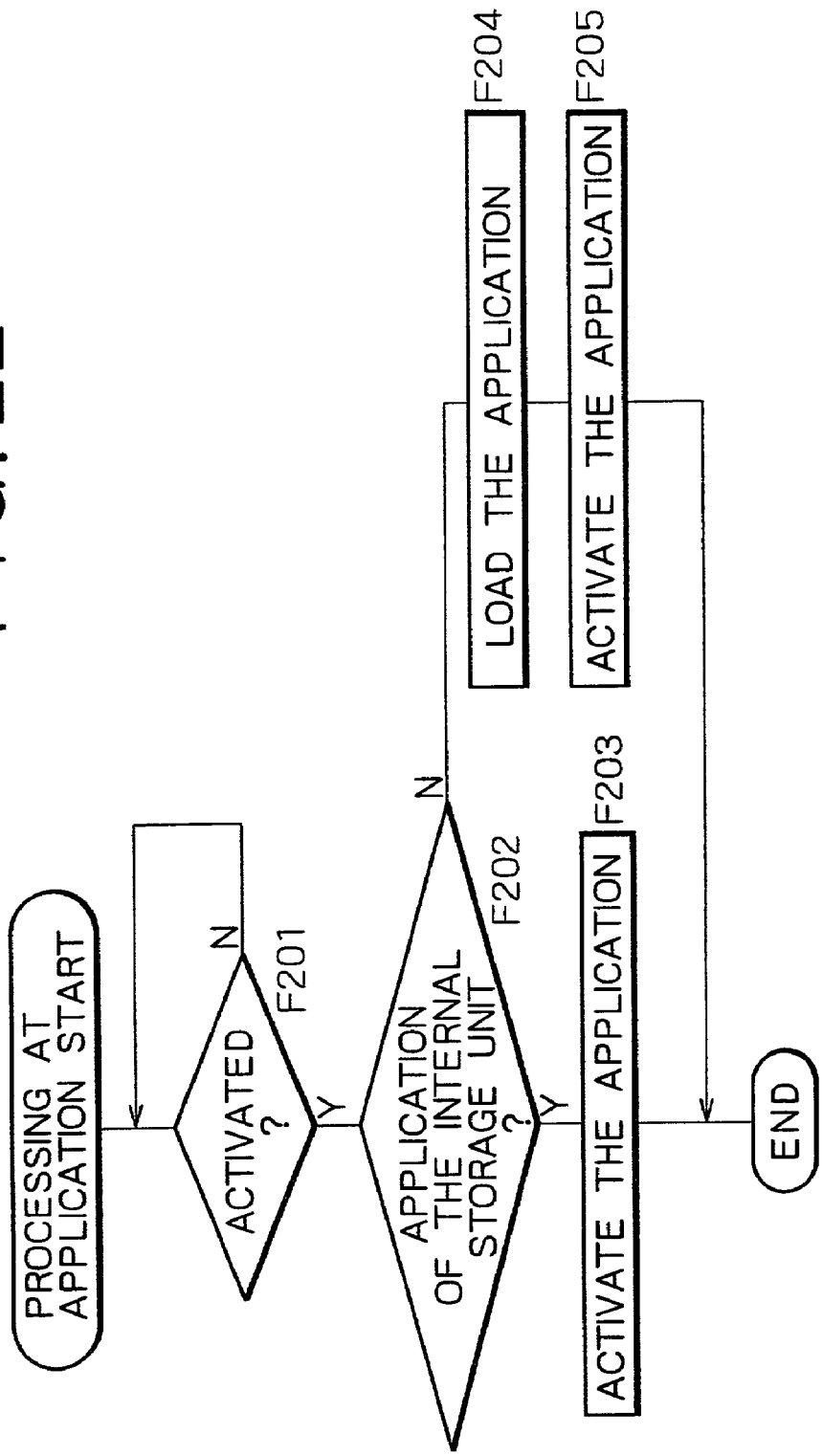
FIG. 22 shows a flowchart representing processing which is carried out when the user selects application software to be activated.
Figure 23:
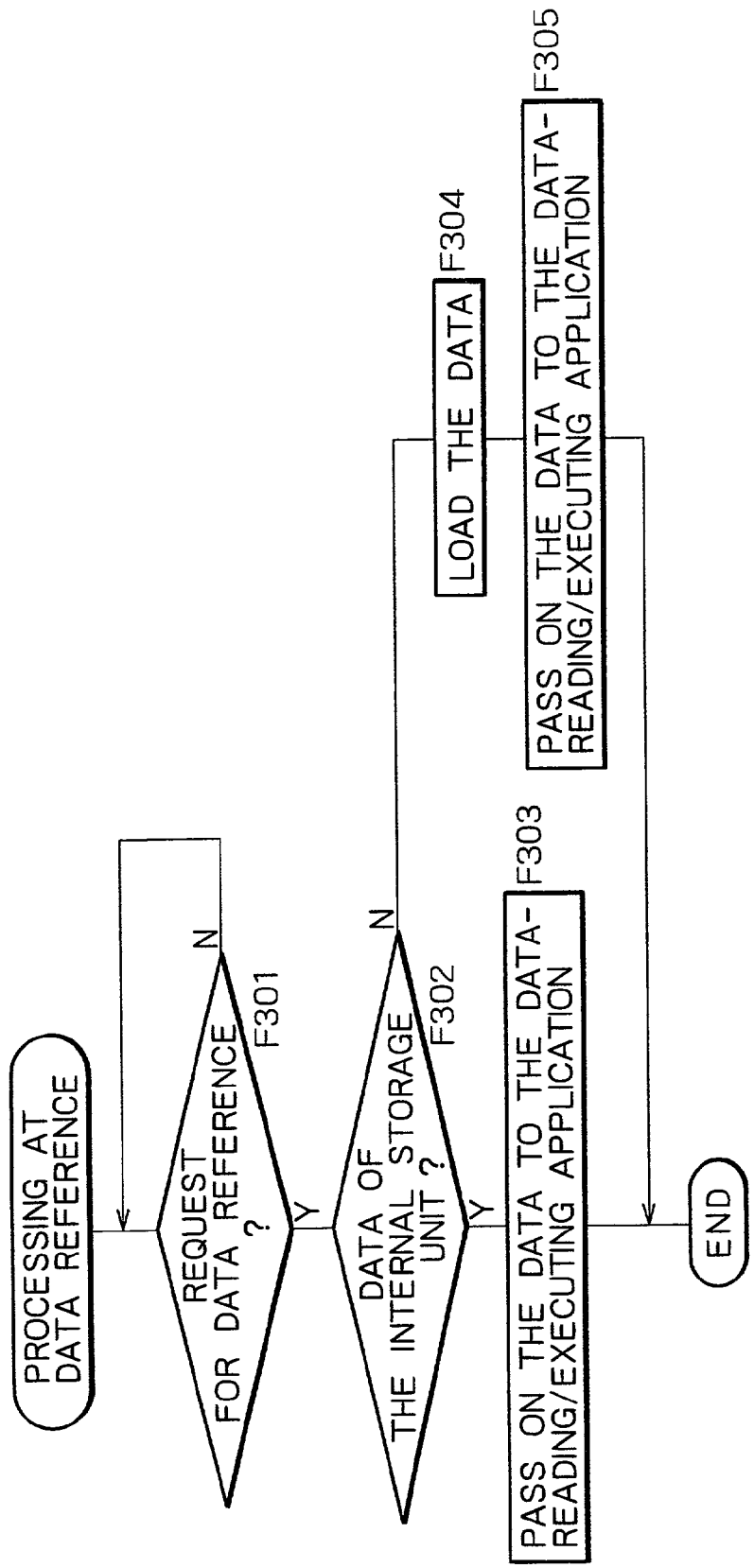
FIG. 23 is a flowchart representing processing which is carried out when a request for reference to a desired data file is made.

Processing carried out by the CPU 22 to execute the operations described above is explained by referring to flowcharts shown in FIGS. 21, 22 and 23.

FIG. 21 is a flowchart representing processing which is carried out after the information-processing apparatus 1 is activated. As shown in the figure, the flowchart begins with a step F101 to form a judgment as to whether or not the user has turned on the power supply. As the user turns on the power supply, the CPU 22 goes on to a step F102.

At the step F102, the CPU 22 carries out an activation process to recognize usable application software and each usable data file, which are stored in the D-RAM 24. When the activation process is completed, the flow of the processing goes on to a step F103 at which the usable application software is displayed on the display unit 2. At that time, a list of relevant data files can also be displayed as well.

The application software and the data files can be displayed in some formats such as a menu screen serving as an initial screen following the activation process and a screen showing a list of selectable pieces of application software and a list of selectable data files. As an alternative, the application software and the data files can be displayed as icons as is the case with the ordinary personal computer and the so-called desk-top computer. Of course, other types of display formats can be applied.

While the information-processing apparatus 1 is being activated, the CPU 22 forms a judgment as to whether or not an external storage unit is connected at the next step F104 and whether or not an external storage unit is disconnected at a step F105 in case no external storage unit is connected. Typically, the CPU 22 forms a judgment as to whether or not a memory card 70 has been inserted into a memory slot 7 at the step F104 and whether or not the memory card 70 has been pulled out from the memory slot 7 at the step F105. In the case of an external storage unit implemented by an external server connected to the information-processing apparatus 1 by a communication network, the CPU 22 forms a judgment as to whether or not a communication with the server has been established at the step F104 and whether or not the communication with the server has been terminated at the step F105.

If the outcome of the judgment formed at the step F104 indicates that an external storage unit is connected, the flow of the processing goes on to a step F106 at which the CPU 22 makes an access to the external storage unit to recognize application software and/or a data file. At the next step F107, the CPU 22 adds the recognized application software and/or the recognized data file to the list appearing on the display unit 2. The flow of the processing then goes back to the step F103.

Typically, a memory card 70 is mounted on a memory slot 7 as an external storage unit. In this case, the CPU 22 loads the recognized application software and/or the recognized data file from the memory card 70 into the D-RAM 24, adding them to the list appearing on the display unit 2.

If the outcome of the judgment formed at the step F104 indicates that a communication with an external server connected to the information-processing apparatus 1 by a communication network has been established in the case of an external storage unit implemented by the server, at the step F106, the CPU 22 recognizes application software and/or a data file which can be downloaded from the server. At the next step F107, the CPU 22 adds the recognized application software and/or the recognized data file to the list appearing on the display unit 2.

If the outcome of the judgment formed at the step F105 indicates that an external storage unit has been disconnected, the flow of the processing goes on to a step F108 at which the CPU 22 carries out processing to delete application software and/or a data file, which are stored in the disconnected external storage unit, from the displayed list appearing on the display unit 2. The flow of the processing then goes back to the step F103.

To be more specific, when the memory card 70 is pulled off from the memory slot 7, application software and/or a data file, which are stored in the removed memory card 70, are erased from the displayed list appearing on the display unit 2.

In the case of an external storage unit implemented by an external server connected to the information-processing apparatus 1 by a communication network, if a communication with an external server has been terminated, application software and/or a data file which can be downloaded from the server are erased from the displayed list appearing on the display unit 2.

It should be noted that, if a memory card 70 has been mounted by the time the activation process is carried out at the step F102, as recognition processing of the activation process, the CPU 22 recognizes application software and a data file, which are stored in the memory card 70. At the next step F103, the CPU 22 adds the application software and the data file to a list displayed on the display unit 2.

In addition, at the step F108, application software and a data file, which have been loaded into the D-RAM 24 and used as valid software and a valid file, are not necessarily to be erased from the displayed list appearing on the display unit 2 by processing to be described later even if they are stored in the removed external storage unit such as the memory card 70.

By carrying out the processing described above, application software and/or a data file are displayed on the display unit 2 on a timely manner when the memory card 70 is mounted on the information-processing apparatus 1 or when a communication with an external server is established through a communication network. By the same token, application software and/or a data file are erased from a screen appearing on the display unit 2 on a timely manner when the memory card 70 is dismounted from the information-processing apparatus 1, or when a communication with an external server through a communication network is terminated.

Thus, the user is capable of recognizing application software and each data file, which are usable at the present time, in a simple manner without being aware of whether the memory card 70 has been mounted or dismounted and aware of other status. To be more specific, the user is capable of recognizing application software and each data file, which are usable at the present time, without being aware of locations for storing the application software and the data file.

At any time, when the user wants to activate a piece of application software on the list appearing on the display unit 2, the user operates the operation unit 35 to select the piece of application software from the list.

FIG. 22 shows a flowchart representing processing which is carried out by the CPU 22 when the user selects application software to be activated from a list appearing on the display unit 2.

As shown in the figure, the flowchart begins with a step F201 to form a judgment as to whether or not the user has carried out an operation to activate selected application software. If the user has carried out an operation to activate selected application software, the flow of the processing goes on to a step F202 to form a judgment as to whether the selected application software to be activated is stored in the internal storage unit such as the D-RAM 24 or stored in the external storage unit such as the memory card 70 or an external server.

If the selected application software to be activated is stored in the internal storage unit, the flow of the processing goes on to a step F203 at which the CPU 22 carries out processing to activate the software directly from the D-RAM 24.

If the selected application software to be activated is stored in the external storage unit, on the other hand, the flow of the processing goes on to a step F204 at which the CPU 22 carries out processing to load the software from the memory card 70 to the D-RAM 24. To put it in detail, the CPU 22 makes an access to the memory card 70 through the memory-card interface 28, and then retrieves the application software from the memory card 70, loading it to the D-RAM 24. In the case of a server serving as the external storage unit, the CPU 22 downloads the application software from the server to the D-RAM 24 by way of the communication unit 36.

At the next step F205, with the application software loaded in the D-RAM 24, the CPU 22 activates the software.

FIG. 23 is a flowchart representing processing which is carried out by the CPU 22 when a request for reference to a desired data file is made, for example, when application software makes a request for reference to a data file or when the user carries out an operation to select a data file from a list appearing on the display unit 2.

As shown in the figure, the flowchart begins with a step F301 at which the CPU 22 forms a judgment as to whether or not a request for reference to a data file has been made. If a request for reference to a data file has been made, the flow of the processing goes on to a step F302 to form a judgment as to whether the requested data file is stored in the internal storage unit such as the D-RAM 24 or stored in the external storage unit such as the memory card 70 or an external server.

If the requested data file is stored in the internal storage unit, the flow of the processing goes on to a step F303 at which the CPU 22 retrieves the data file from the D-RAM 24 and supplies the file to the application software being executed.

If the requested data file is stored in the external storage unit, on the other hand, the flow of the processing goes on to a step F304 at which the CPU 22 first of all carries out processing to load the file to the D-RAM 24. To put it in detail, the CPU 22 makes an access to the memory card 70 through the memory-card interface 28, and then retrieves the data file from the memory card 70, loading it to the D-RAM 24. In the case of an external server serving as the external storage unit, the CPU 22 downloads the data file from the server to the D-RAM 24 by way of the communication unit 36.

At the next step F305, with the data file loaded in the D-RAM 24, the CPU 22 retrieves the data file from the D-RAM 24 and supplies the file to the application software being executed.

With the CPU 22 carrying out the pieces of processing represented by the flowcharts shown in FIGS. 21 to 23 as described above, the user only needs to simply select application software to be activated and/or a data file to be referenced from a list appearing on the display unit 2 without being aware of whether the application software and/or the data file are stored in the internal or external storage unit. The user thus enjoys noticeably improved operatability.

It should be noted that the processing described above can be carried out by the CPU 22 by execution of software at an OS or application level.

At the OS level, the processing is carried out by the CPU 22 in accordance with information received from application software and/or a user interface as a program at the OS layer of the processing hierarchy explained earlier by referring to FIG. 3.

As an alternative, it is also possible to create an application program to be executed by the CPU 22 for activation of desired application software and reference to a data file. Such an activation/reference application program can be put in a readily invokable state. That is to say, when the user carries out an operation to activate certain application software or when a request for reference to a data file is made, the activation/reference application program is executed to activate desired application software or to reference a data file.

9: Typical Server Connected by a Communication Network

Figure 24:
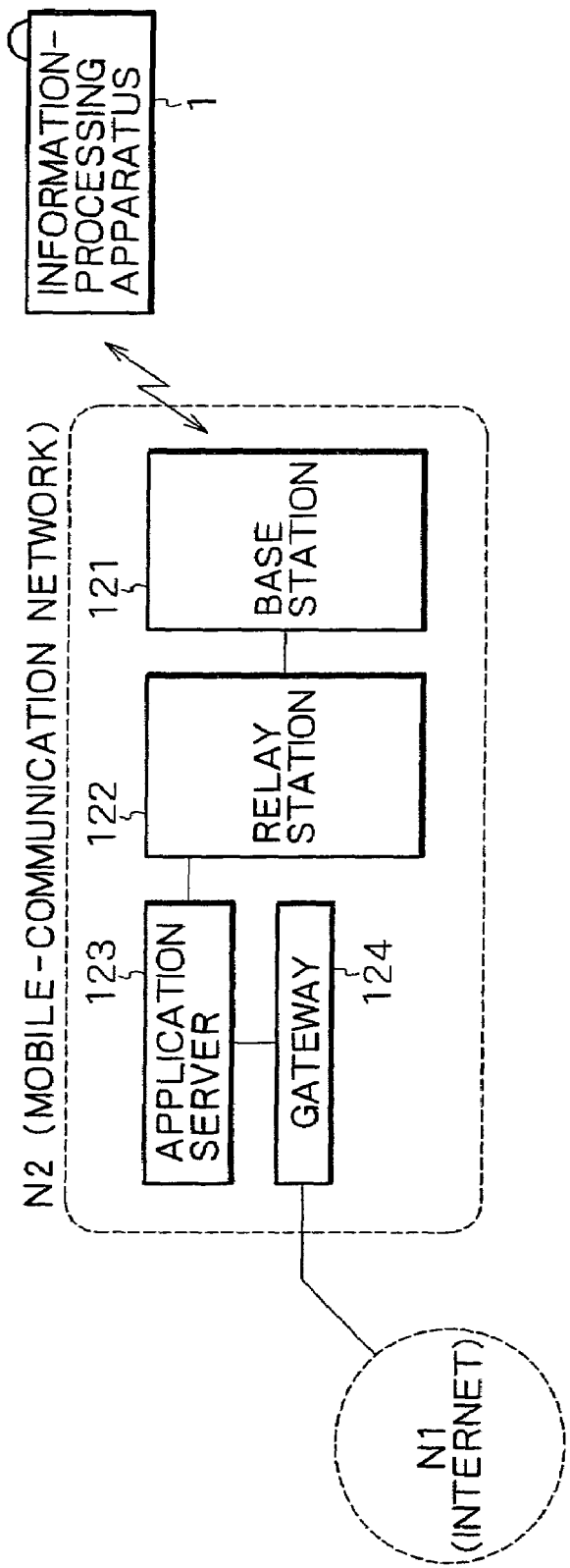
FIG. 24 is an explanatory diagram showing a server connected by a communication network to the information-processing apparatus implemented by the embodiment.

In the processing described above, an external server connected by a communication network to the information-processing apparatus 1 as shown in FIG. 24 may serve as the external storage unit.

FIG. 24 is a diagram showing a model of a communication network implemented for a portable-telephone system or the like. A mobile-communication network N2 is a communication network provided by a communication enterprise generally known as a provider. As shown in the figure, the mobile-communication network N2 comprises a base station 121, a relay station 122, an application server 123 and a gateway 124.

The information-processing apparatus 1 implemented by the embodiment establishes radio communication with the base station 121 employed in the mobile-communication network N2. It should be noted that there are of course a plurality of base stations 121 and a plurality of relay stations 122.

The application server 123 is a member for providing application software and data files to the information-processing apparatus 1 and other terminals. The gateway 124 functions as a conversion unit for handling data of typically home pages in the Internet N1. Thus, the application server 123 is capable of communicating with the Internet N1 through the gate away 124. Information acquired from the Internet N1 through such communication can be transmitted to a terminal such as the information-processing apparatus 1.

With such a mobile-communication network N2, the information-processing apparatus 1 is capable of downloading application software and data files from the application server 123 as well as application software and data files from the Internet N1.

The information-processing apparatus 1 treats the application server 123 like an external storage unit, allowing application software executed by the CPU 22 to use a necessary data file downloaded from the application server 123.

With the application server 123 treated like an external storage unit as described above, application software and/or a data file, which can be downloaded from the application server 123, are displayed as a list appearing on the display unit 2 as long as the communication with the application server 123 is active. In addition, when the user carries out an operation to select the application software from the list, the software is downloaded and activated. In this way, the user is capable of very easily utilizing application software and/or a data file, which are provided by the application server 123.

10: File Search Processing

The following description explains search processing which is carried out when application software activated in the information-processing apparatus 1 uses a data file also referred to as a database database.

As described earlier, the information-processing apparatus 1 includes the D-RAM 24 and the ROM 23. The D-RAM 24 and the ROM 23 each serve as an internal storage unit for storing application programs and data files.

In addition, the memory card 70 is an external storage unit accessible to the information-processing apparatus 1. It should be noted that the communication unit 36 allows accesses to be made to servers and home pages through a communication network. Thus, these servers shown in FIG. 24 or the like can be regarded as an external storage unit accessible to the information-processing apparatus 1.

The user is capable of giving a command to the information-processing apparatus 1 to activate any application software in order to carry out processing based on the application software. It is needless to say that the user is allowed to verify and modify a variety of data files referred to by application software in the course of its execution.

Figure 25:
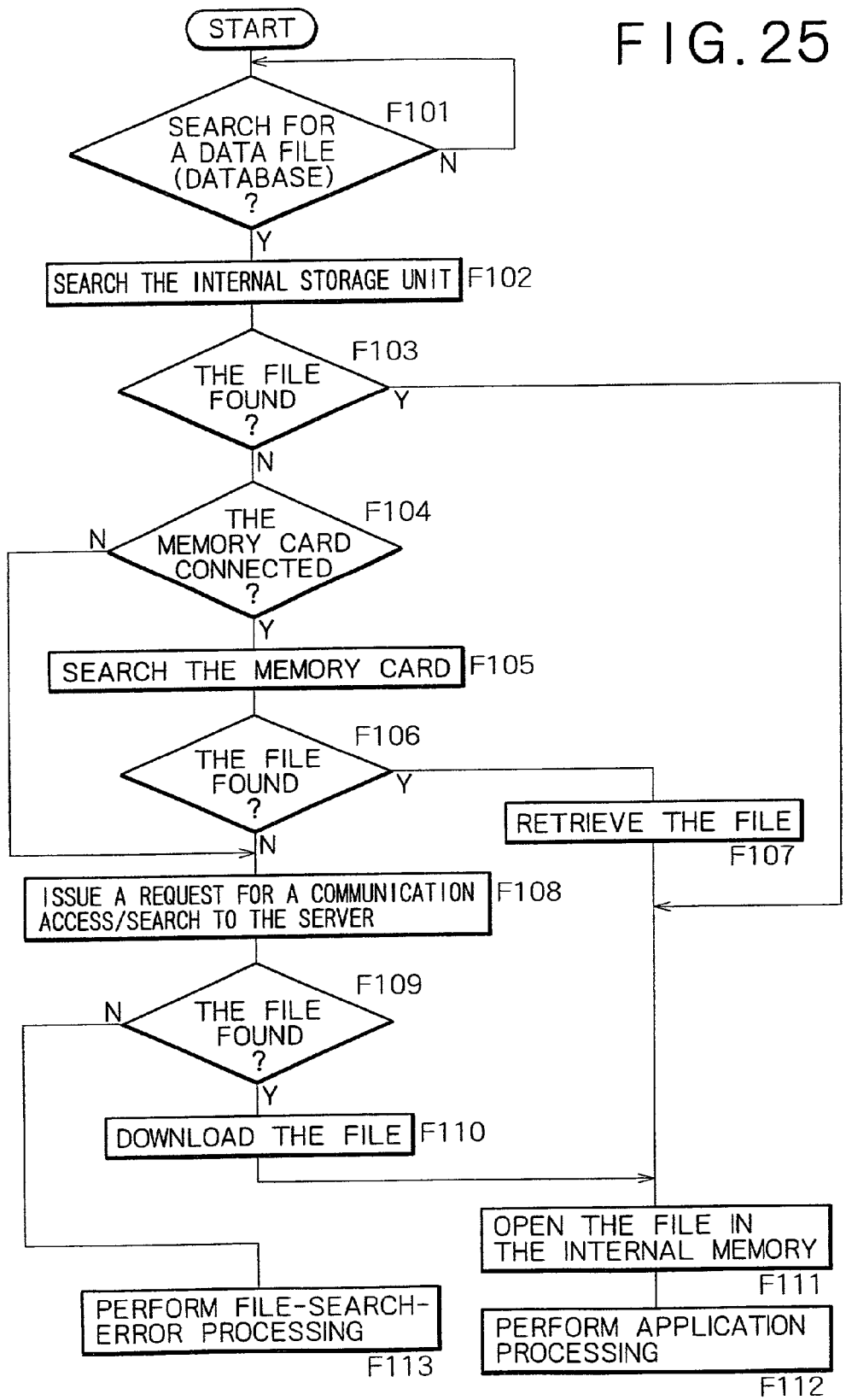
FIG. 25 is a flowchart representing processing to search storage units for a data file.

In processing based on application software, a relevant data file (or a database database) may be opened for use. In this case, search processing represented by a flowchart shown in FIG. 25 is carried out by execution of the OS or application software.

As shown in the figure, the flowchart begins with a step F101 to form a judgment as to whether or not a request for a search for a data file has been made. If a request for a search for a data file has been made, the flow of the processing goes on to a step F102 at which the D-RAM 24 serving as an internal storage unit is searched for the data file. The flow of the processing then goes on to a step F103 to form a judgment as to whether or not the data file is found. If the data file is found, the flow of the processing goes on to a step F111 at which the file is opened. At the next step F112, the application software is executed to carry out processing using the data file.

If the outcome of the judgment formed at the step F103 indicates that the data file does not exist, on the other hand, the flow of the processing goes on to a step F104 to form a judgment as to whether or not the memory card 70 has been plugged into the memory slot 7.

If the memory card 70 has been plugged into the memory slot 7, the flow of the processing goes on to a step F105 at which the memory card 70 is searched for the desired data file. At the next step F106, a judgment on the existence of the data file is formed.

If the data file is found, the flow of the processing goes on to a step F107 at which the file is loaded from the memory card 70 into the D-RAM 24. Then, the flow of the processing goes on to a step F111 at which the file is opened. At the next step F112, the application software is executed to carry out processing using the data file.

If the outcome of the judgment formed at the step F106 indicates that the data file does not exist or if the outcome of the judgment formed at the step F104 indicates that no memory card 70 has been plugged into the memory slot 7, on the other hand, the flow of the processing goes on to a step F108 at which the communication unit 36 makes a communication access to typically the application server 123 shown in FIG. 24 to make a request for a search for the desired data file. At the next step F109, a judgment on the existence of the data file is formed. If the data file is found, the flow of the processing goes on to a step F110 at which the file is downloaded from the application server 123 into the D-RAM 24 employed in the information-processing apparatus 1. Then, the flow of the processing goes on to a step F111 at which the file is opened. At the next step F112, the application software is executed to carry out processing using the data file.

If the outcome of the judgment formed at the step F109 indicates that the data file does not exist, on the other hand, the flow of the processing goes on to a step F113 at which file-error processing is carried out.

As described above, in this embodiment, if a request for a search for a desired data file is made, under control of application software or the OS, first of all, the internal storage unit is searched for the file. If the desired data file is not found in the internal storage unit, the memory card 70 is searched for the file. If the desired data file is not found in the memory card 70 either, an external server is searched for the file.

Thus, it is possible to search a wide range of storage units for a desired data file and the user does not need to specify a storage unit to be searched for the file.

The above description explains the configuration of an information-processing apparatus implemented by this embodiment, a typical internal storage unit, a typical external storage unit and typical processing related to application software and/or data files. It should be noted, however, that the scope of the present invention is not limited to details of the information-processing apparatus, the storage units and the processing. Instead, a variety of changes and modifications can be made to the details. For example, the external storage unit can conceivably be portable recording media such as a variety of memory cards each having a type different from the memory card 70, optical discs, magneto-optical discs and magnetic discs.

Furthermore, an external storage unit connected to the information-processing apparatus 1 by a communication line can conceivably be another so-called information apparatus connected to the information-processing apparatus 1 in addition to the external server shown in FIG. 24. For example, a personal computer or the like connected to the information-processing apparatus 1 by an IEEE-1394 cable or an USB cable can as a whole be regarded as an external storage unit.

In addition, the present invention can be applied to not only a portable information-processing apparatus, but also a broad range of other apparatuses.

While a preferred embodiment of the present invention has been described using specific terms, such description is for illustrative purposes only, and it is to be understood that changes and variations may be made without departing from the spirit or scope of the following claims.

What is claimed is:

1. An information-processing apparatus comprising:
   storage means for storing application programs and data files;
   calculating means for activating an application program stored in said storage means to carry out predetermined processing;
   media drive means for recording and playing back information into and from an external recording medium, said media drive means including an application program; and
   control means for controlling said media-drive means and said storage means when said external recording medium for recording an application program is mounted on said media drive means, wherein,
   when said storage means includes a remaining free storage area with a size large enough for accommodating said application program in said external recording medium,
   said application program in said external recording medium is installed in said storage means, but
   when said storage means includes a remaining free storage area with a size not large enough for accommodating said application program in said external recording medium,
   an application program and/or a data file stored in said storage means is saved to said external recording medium in order to allocate enough free storage area in said storage means to accommodate said application program recorded in said external recording medium, and said application program in said external recording medium is installed in said storage means once there is enough free storage area in said storage means to accommodate said application program.

2. An information-processing apparatus according to claim 1, wherein said information-processing apparatus further has an activation-history management means for storing activation history information for each application program on said storage means and for updating said activation history information for a specific application program upon activation of said specific application program by said calculating means, and said control means selects an application program to be saved to said external recording medium on the basis of said activation history information.

3. An information-processing apparatus according to claim 1 wherein said storage means is a non-volatile storage area.

4. An information-processing apparatus according to claim 1 wherein, when an application program or a data file has been saved in said external recording medium being dismounted from said media drive means, said control means controls said media-drive means and said storage means to uninstall an application program installed from said external recording medium into said storage means in order to restore said installed application program to said external recording medium and to restore said application program or said data file saved in said external recording medium to said storage means.

5. An information-processing apparatus according to claim 1 wherein said calculating means activates an application program upon installation of said application program from said external recording medium into said storage means.

6. An information-processing method comprising:
a judgment step of determining the size of a free storage area available in internal storage means of an information processing apparatus and the size of a storage area required for accommodating an application program loaded from an external recording medium into said internal storage means and determining whether or not said application program can be installed in said internal storage means;
a save step of saving an application program and/or a data file stored in said internal storage means to said external recording medium in order to allocate a new free storage area in said internal storage means when it is determined in said judgment step that said application program in said external recording medium cannot be installed in said internal storage means; and
an installation step of installing said application program in said external recording medium into said internal storage means after said new free storage area has been allocated in said internal storage means.

7. An information-processing method according to claim 6, wherein said information-processing method further having an activation step of activating an application program upon installation of said application program from said external recording medium into said storage means by said installation step.

8. An information-processing method according to claim 6, wherein said information-processing method further has a history-updating step of updating activation history information for an application program upon activation of said application program, and an application program to be saved to said external recording medium is selected, in said save step, on the basis of said activation history information.

9. An information-processing method according to claim 6, wherein, when said application program or said data file has been saved in said external recording medium being dismounted, said information-processing method further having a restoration step of uninstalling an application program installed from said external recording medium into said storage means to restore said installed application program to said external recording medium and restoring an application program or a data file saved in said external recording medium to said storage means.

10. An information-processing apparatus comprising:
internal storage means;
connection means for exchanging information between said information-processing apparatus and an external recording medium;
calculating means for activating application software and carrying out processing based on said application software;
search means for first searching said storage means for a relevant data file to be used by said activated application software, and for searching said external recording medium for said relevant data file through said connection means when said data file is not found in said internal storage means; and
execution means for executing said application software in said external recording medium when said relevant data file is found in said external recording medium, and for executing said application software in said internal storage means when said relevant data file is found in said internal storage means.

11. An information-processing apparatus according to claim 10 wherein said external recording medium is a portable recording medium, and said connection means is implemented as a recording and playback unit for recording and playing back data onto and from said portable recording medium.

12. An information-processing apparatus according to claim 10 wherein said external recording medium is an external server connected to said information-processing apparatus by a wire or radio communication line, and said connection means is implemented as a communication unit for communicating with said external server through said communication line.

13. An information-processing method adopted by a calculating means operating in accordance with a predetermined step to search for a desired file related to processing of said predetermined step, said information-processing method comprising:
a search step of searching storage means for said desired file;
a connection step of setting a connection to an external recording medium through connection means when said desired file is not found in said internal storage means;
a search step of searching said external recording medium for said desired file after said connection step is set; and
an execution step of executing said predetermined step in said external recording medium when said desired file is found in said external recording medium, and for executing said predetermined step in said internal storage means when said desired file is found in said internal storage means.

14. An information-processing method according to claim 13, wherein said external recording medium searched for said desired file, when said desired file is not found in said storage means, is a portable recording medium, and said connection means allowing information to be input from and output to said external recording medium is a recording/playback unit for recording and playing back data into and from said portable recording medium.

15. An information-processing method according to claim 13, wherein said external recording medium searched for said desired file, when said desired file is not found in said storage means, is an external server connected by a wire or radio communication line, and said connection means allowing information to be input from and output to said external recording medium is a communication unit for carrying out communications with said external recording medium through said communication line.

16. An information-processing apparatus comprising:
   internal storage means for storing application software and data files;
   connection means for exchanging information between said information-processing apparatus and an external recording medium for storing application software and data files;
   recognition means for recognizing application software or data files, which are stored in said external recording medium connected to said information-processing apparatus by said connection means;
   user interface means for displaying application software or data files, which are stored in said internal storage means, displaying application software or data files, which are stored in said external recording medium and recognized by said recognition means, and for allowing a piece of said displayed application software to be selected for activation and for allowing one of said displayed data files to be selected for use; and
   activation processing control means for loading application software from said external recording medium into said internal storage means and carrying out processing to activate said loaded application software in response to an operation carried out on said user interface means to make a request for activation of said application software.

17. An information-processing apparatus according to claim 16, wherein said information-processing apparatus further having reference processing control means for loading a data file from said external recording medium into storage means and carrying out a process to reference said loaded data file in response to an operation carried out on said user interface means, or for loading a data file required in the course of processing based on application software in execution from said external recording medium into said storage means and carrying out a process to reference said loaded data file, when a request is made for reference of said data file.

18. An information-processing apparatus according to claim 16 wherein said external recording medium is a portable recording medium, and said connection means is implemented as a recording and playback unit for recording and playing back data onto and from said portable recording medium.

19. An information-processing apparatus according to claim 16 wherein said external recording medium is an external server connected by a wire or radio communication line, and said connection means is implemented as a communication unit for communicating with said external server through said communication line.

20. An information-processing method comprising:
   an activation-detecting step of detecting an operation to activate application software;
   a judgment step of forming a judgment as to whether application software to be activated which is detected by said activation-detecting step is stored in an internal storage means or an external recording medium;
   a loading step of loading application software from said external recording medium in the case of result of said judgment step indicating that said application software is stored in said external recording medium; and
   an activation step of activating application software loaded on said internal storage means by said loading step.

21. An information-processing method according to claim 20, wherein said information-processing method further having a data-file-referencing step of loading a data file from said external recording medium into said storage means and carrying out a process to reference said loaded data file in response to an operation carried out on said user interface means, or for loading a data file required in the course of processing based on application software in execution from said external recording medium into said storage means and carrying out a process to reference said loaded data file, when a request is made for reference of said data file.

22. An information-processing method according to claim 20 wherein said external recording medium is a portable recording medium, and application software is played back from said portable recording medium in said loading step.

23. An information-processing method according to claim 20 wherein said external recording medium is an external server connected by a wire or radio communication line, and application software is downloaded from said external server through said communication line in said loading step.

* * * * *